ID  US009980296B2

(12) United States Patent
Wang et al.

(10) Patent No.: US 9,980,296 B2
(45) Date of Patent: May 22, 2018

(54) METHOD AND APPARATUS FOR COMMUNICATION IN A NETWORK OF WLAN OVERLAPPING BASIC SERVICE SET

(71) Applicant: InterDigital Patent Holdings, Inc., Wilmington, DE (US)

(72) Inventors: Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 113 days.

(21) Appl. No.: 14/760,347

(22) PCT Filed: Jan. 10, 2014

(86) PCT No.: PCT/US2014/011081
§ 371 (c)(1),
(2) Date: Jul. 10, 2015

(87) PCT Pub. No.: WO2014/110397
PCT Pub. Date: Jul. 17, 2014

(65) Prior Publication Data
US 2015/0359008 A1    Dec. 10, 2015

Related U.S. Application Data

(60) Provisional application No. 61/751,558, filed on Jan. 11, 2013, provisional application No. 61/774,043, filed on Mar. 7, 2013.

(51) Int. Cl.
*H04W 74/08* (2009.01)
*H04W 74/00* (2009.01)
(Continued)

(52) U.S. Cl.
CPC ..... *H04W 74/0875* (2013.01); *H04W 74/002* (2013.01); *H04W 74/004* (2013.01);
(Continued)

(58) Field of Classification Search
CPC ........... H04W 74/0875; H04W 74/002; H04W 74/004; H04W 74/0891; H04W 74/08; H04W 84/12
See application file for complete search history.

(56) References Cited

U.S. PATENT DOCUMENTS 8,503,938 B2 * 8/2013 Laroia .................. H04W 24/08
370/230
2006/0171357 A1    8/2006 King et al.
(Continued)

FOREIGN PATENT DOCUMENTS

| EP | 1784031 A1 | 5/2007 |
|---|---|---|
| WO | 01/76306 | 10/2001 |
| WO | 2013/116534 A1 | 8/2013 |

OTHER PUBLICATIONS

Abraham, et al., "Relays for 802.11ah," IEEE 802.11-12/1323r0, (Nov. 2012).

(Continued)

*Primary Examiner* — Wei Zhao
(74) *Attorney, Agent, or Firm* — Volpe and Koenig, P.C.

(57) ABSTRACT

A method and apparatus for communication in a network of WLAN overlapping basic service set (OBSS) are disclosed. A station or an access point may indicate its interference reporting and inter-BSS coordination capabilities in a message. At least one of quality of service (QoS) settings, transmission opportunity (TXOP), restricted access window (RAW) or beacon subinterval schedules, or traffic indication map (TIM) or uplink access window assignment may be coordinated. The station may receive a request for interference measurements on the basic service set (BSS) of the station or neighboring BSSs that the station can overhear. The station may transmit an interference measurement report to an access point. The coordination may be performed based on the interference measurement report. Fur- (Continued)

thermore, STAs may transmit channel or sector preferences to APs and receive channel or sector assignments.

11 Claims, 30 Drawing Sheets

(51) Int. Cl.
   *H04W 72/04* (2009.01)
   *H04W 72/12* (2009.01)
   *H04W 84/12* (2009.01)
   *H04L 1/16* (2006.01)

(52) U.S. Cl.
   CPC ....... *H04W 74/0891* (2013.01); *H04L 1/1671* (2013.01); *H04W 72/04* (2013.01); *H04W 72/1289* (2013.01); *H04W 84/12* (2013.01)

(56) References Cited

U.S. PATENT DOCUMENTS

| | | | |
|---|---|---|---|
| 2009/0207801 A1 | 8/2009 | Morton et al. | |
| 2009/0232240 A1 | 9/2009 | Lakkis | |
| 2012/0188901 A1 | 7/2012 | Struhsaker et al. | |
| 2012/0327915 A1* | 12/2012 | Kang | H04L 5/0007 370/336 |
| 2013/0195036 A1* | 8/2013 | Quan | H04W 72/04 370/329 |
| 2013/0294318 A1* | 11/2013 | Amerga | H04W 4/06 370/312 |
| 2015/0078259 A1 | 3/2015 | Junior et al. | |

OTHER PUBLICATIONS

Calcev, et al., "Sensor Only BSS," Nov. 12, 1083-01-00ah—Sensor Only BSS, (Sep. 2012).
Cheong, "TGah Functional Requirements and Evaluation Methodology Rev. 5," IEEE 802.11-09/0905r5, (Jan. 2012).
Costa, et al., "Review of Overlapping 802.11 Networks (OBSS) Status and IEEE 802.11 Solutions," IEEE 802.11-12/936r0, (Jul. 2012).
Ghosh, et al., "Restricted Access Window Signaling for Uplink Channel Access," IEEE 802.11-12/0843r0, p. 1-13, (Jul. 2012).
Gong, et al., "11ah Channelization of China," IEEE 802.11-11/1320r0, (Sep. 2011).
Gong, et al., "11ah Channelization of China," IEEE 802.11-11/1320r1, (Sep. 2011).
Park, et al., "Channel Access Issues of OBSSs with Difference Coverage Sizes," Nov. 12, 1336-01-00ah-Overlapping OBSSs, (Nov. 2012).
Wong, et al., "Two-Hop Relay Function," IEEE 11-12/1330r0, (Nov. 2012).
Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D3.0, (Jun. 2012).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D2.0 (Jul. 2012).
Draft Standard for Information technology—Telecommunications and information exchange between systems Local and metropolitan area networks—Specific requirements, Part 11: Wireless LAN Medium Access Control (MAC) and Physical Layer (PHY) Specifications Amendment 6: Sub 1 GHz License Exempt Operation, IEEE P802.11ah/D0.1 (May 2013).
IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012, (Mar. 2012).
IEEE Standard for Information technology—Telecommunications and information exchange between systems, Local and metropolitan area networks—Specific requirements, Part 11: Wireless LAN Medium Access Control (MAC) and Physical Layer (PHY) Specifications, Amendment 2: MAC Enhancements for Robust Audio Video Streaming, Approved Mar. 29, 2012, IEEE-SA Standards Board, IEEE Std 802.11aa™-2012, (May 2012).
IEEE Standard for Information Technology—Telecommunications and information exchange between systems—Local and metropolitan area networks—Specific requirements. Part 11: Wireless LAN Medium Access Control (MAC) and Physical Layer (PHY) Specifications. Prepared by the 802.11 Working Group of the LAN/MAN Standards Committee of the IEEE Computer Society, IEEE Draft P802.11-REVmb™/D12, Nov. 2011, (Nov. 2011).
IEEE P802.11ac/D4.0 Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz, IEEE P802.11ac/D4.0 (Oct. 2012).
IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, IEEE Std 802.11ac-2013 (Dec. 2013).
IEEE Standard for Information technology—Telecommunications and information exchange between systems—Local and metropolitan area networks—Specific requirements, Part 15.4: Wireless Medium Access Control (MAC) and Physical Layer (PHY) Specifications for Low-Rate Wireless Personal Area Networks (WPANs), IEEE Std 802.15.4™-2006 (Sep. 2006).
IEEE Standard for Local and metropolitan area networks—Part 15.4: Low-Rate Wireless Personal Area Networks (LR-WPANs), Amendment 3: Physical Layer (PHY) Specifications for Low-Data-Rate, Wireless, Smart Metering Utility Networks, IEEE Std 802.15.4g-2012 (Apr. 2012).
IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, IEEE Std. 802.11n-2009 (Sep. 11, 2009).
Park, "Proposed Specification Framework for TGah," IEEE 802.11-12/1406r0, pp. 1, 28-29, and 40 (Nov. 2012).

* cited by examiner

| 201 | 202 | 203 | 204 | 205 | 206 | 207 | 208 | 209 | 210 | 211 |
|---|---|---|---|---|---|---|---|---|---|---|
| ELEMENT ID | LENGTH | POTENTIAL TRAFFIC SELF | ALLOCATED TRAFFIC SELF | ALLOCATED TRAFFIC SHARED | EDCA ACCESS FACTOR | HCCA PEAK | HCCA ACCESS FACTOR | OVERLAP | SHARING POLICY | SUBELEMENTS |
| 1 | 1 | 5 | 5 | 5 | 1 | 2 | 1 | 1 | 1 | VARIABLE |

OCTETS:

| ELEMENT ID (2301) | LENGTH (2302) | CHANNEL OR SECTOR OPERATING CAPABILITIES (2303) | CHANNEL OR SECTOR PEFERENCES INDICATION (2304) |

METHOD AND APPARATUS FOR COMMUNICATION IN A NETWORK OF WLAN OVERLAPPING BASIC SERVICE SET

CROSS REFERENCE TO RELATED APPLICATIONS

This application claims the benefit of U.S. Provisional Application Ser. No. 61/751,558 filed Jan. 11, 2013 and U.S. Provisional Application Ser. No. 61/774,043 filed Mar. 7, 2013, the contents of which are hereby incorporated by reference.

BACKGROUND

A wireless local area network (WLAN) in an infrastructure basic service set (BSS) mode has an access point (AP) for the BSS and one or more stations (STAs) associated with the AP. The AP typically has access or an interface to a distribution system (DS) or another type of wired or wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may be sent through the AP where the source STA sends traffic to the AP and the AP delivers the traffic to the destination STA. Such traffic between STAs within a BSS is peer-to-peer traffic. Such peer-to-peer traffic may be sent directly between the source and destination STAs with a direct link setup (DLS) using an 802.11e DLS or an 802.11z tunneled DLS (TDLS). A WLAN in an independent BSS mode has no AP and STAs communicate directly with each other.

STAs in networks of networks may experience different degrees of interference and different numbers of neighboring STAs competing for wireless medium access due to overlapping BSS's (OBSS). Furthermore, when deployments of APs and BSS's are dense, QoS may not be satisfied across the OBSS. STAs capable of multiple channel operating modes may also experience varying channel conditions for the different available channels. Accordingly there is a need for methods and apparatuses to enable coordination in OBSS and channel preference and assignment procedures.

SUMMARY

A method and apparatus for communication in a network of WLAN overlapping basic service set (OBSS) are disclosed. A station or an access point may indicate its interference reporting and inter-BSS coordination capabilities, for example, in a probe request frame, an association request frame, a beacon frame, a short beacon frame, a probe response frame, or an association response frame. At least one of quality of service (QoS) settings, transmission opportunity (TXOP), restricted access window (RAW) or beacon subinterval schedules, or traffic indication map (TIM) or uplink access window assignment may be coordinated. The station may receive a request for interference measurements on the basic service set (BSS) of the station or neighboring BSSs that the station can overhear. The station may transmit an interference measurement report to an access point. The coordination may be performed based on the interference measurement report. Furthermore, STAs may transmit channel or sector preferences to APs and receive channel or sector assignments.

BRIEF DESCRIPTION OF THE DRAWINGS

A more detailed understanding may be had from the following description, given by way of example in conjunction with the accompanying drawings wherein:

FIG. 2 is a diagram of a QLoad Report element specified in IEEE 802.11aa standards;

FIG. 23 is a diagram of another example format for channel or sector preferences report IE;

DETAILED DESCRIPTION

Figure 1A:
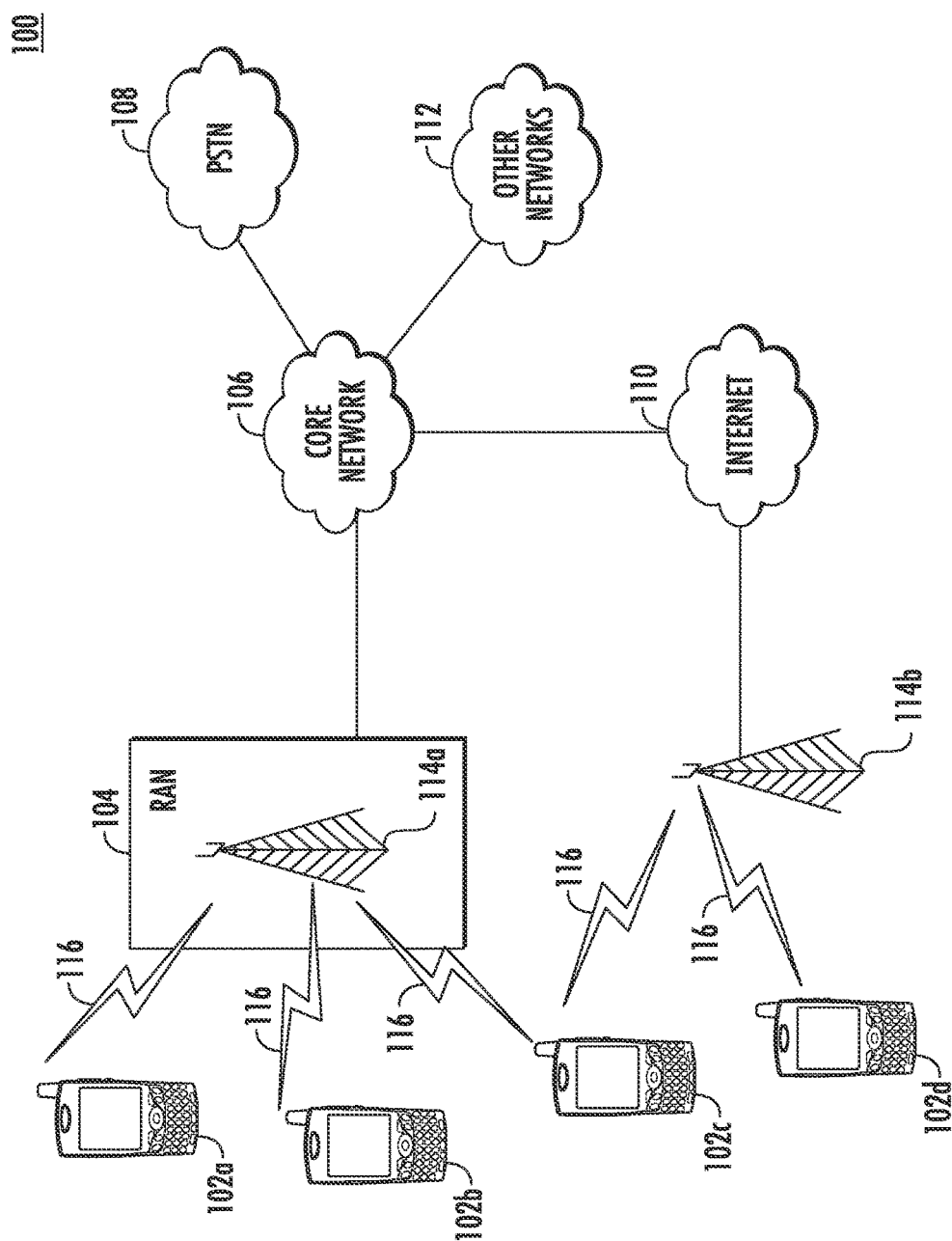
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDM (OFDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
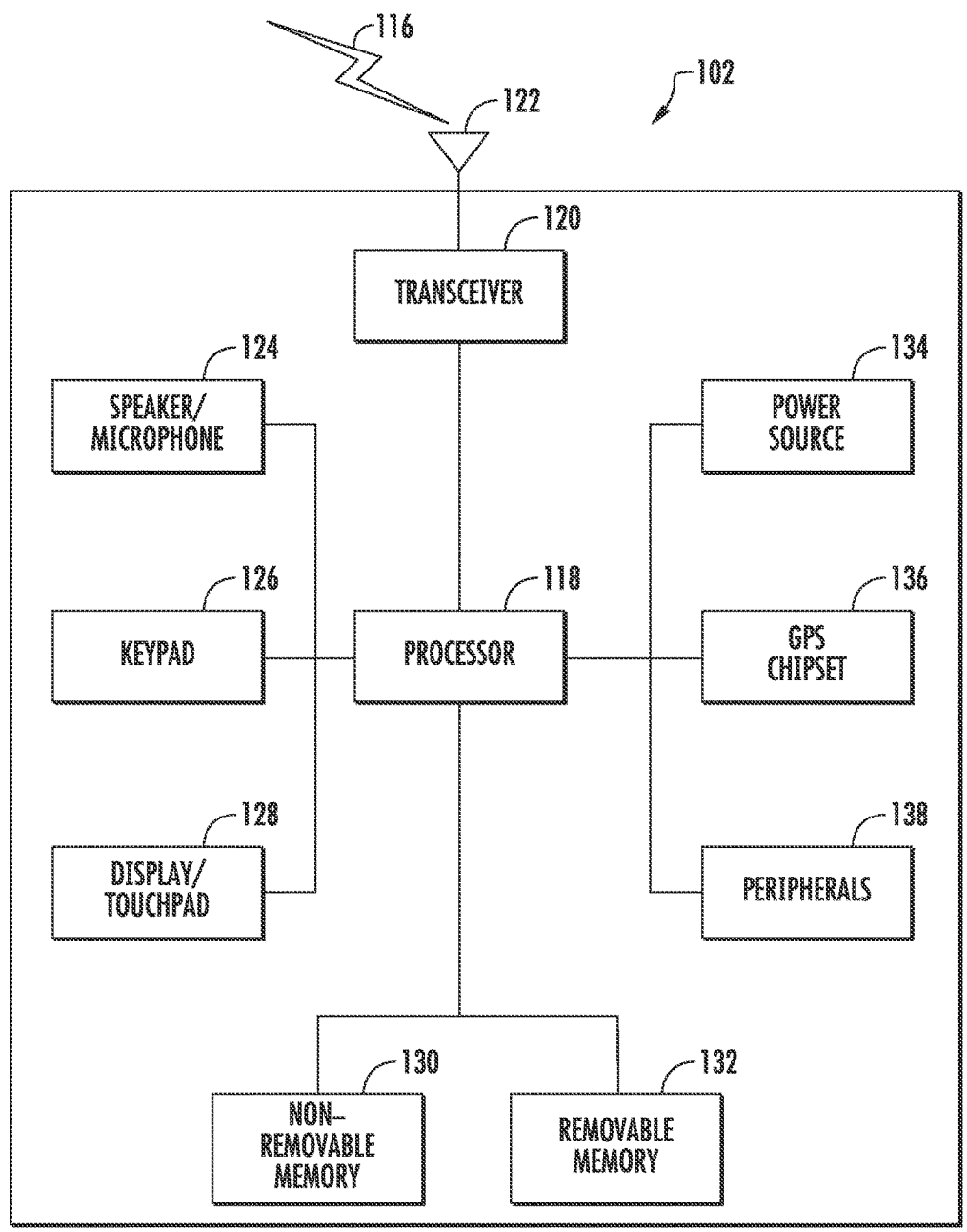
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transmitter and receiver or transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
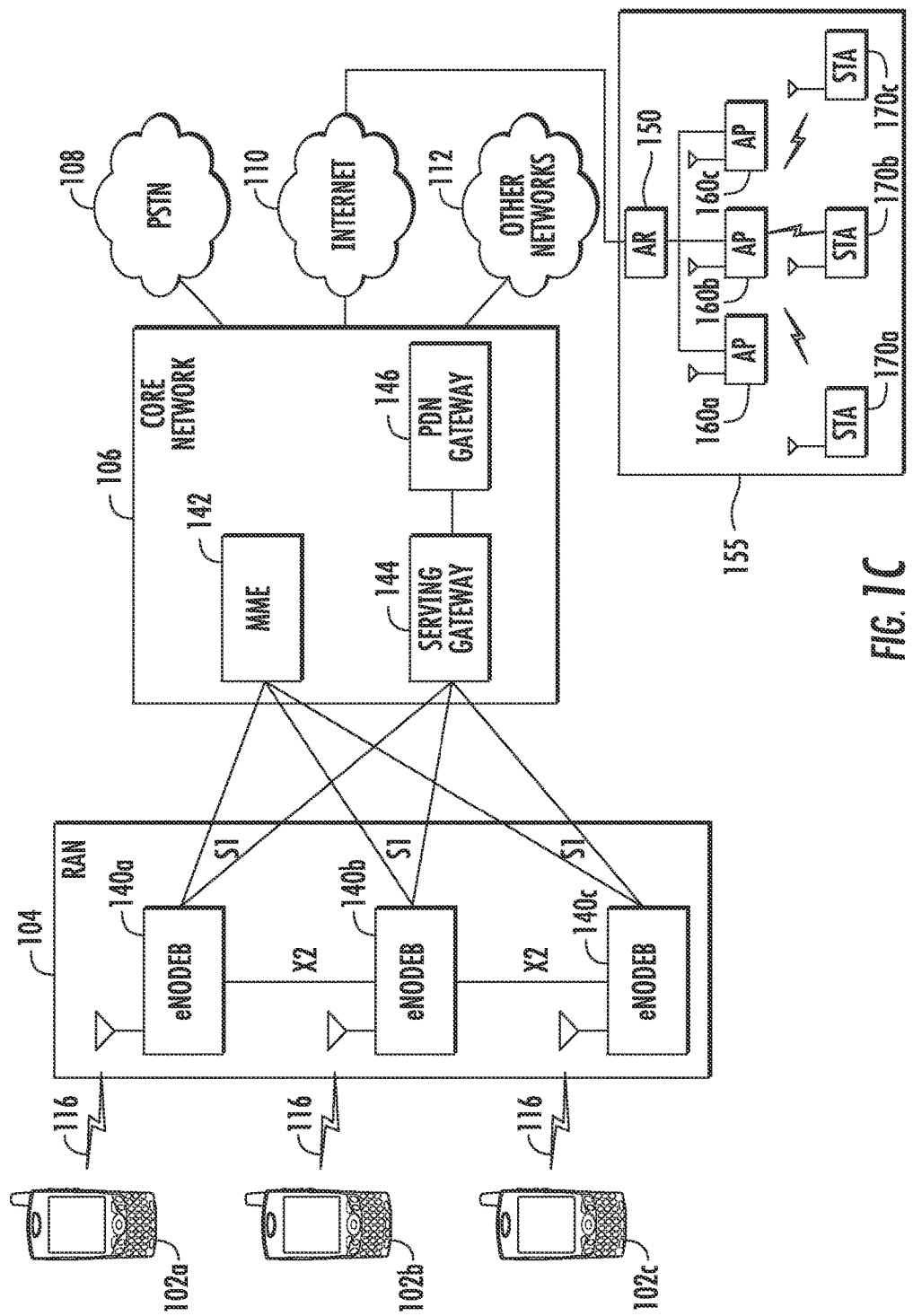
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Two mechanisms are used for overlapping basic service set (OBSS) coordination in IEEE802.11aa standards, namely, QLoad Reports and Hybrid Coordinated function Controlled Channel Access (HCCA) transmission opportunity (TXOP) negotiation.

APs may use QLoad Reports from all BSSs in the OBSS for channel selection as well as for conducting admission control and scheduling. APs include a QLoad Report element in QLoad Report frames or Protected QLoad Report frames, or alternatively in beacons, to announce the traffic load of its own BSS as well as other BSSs in the OBSS that the AP obtained.

FIG. 2 is a diagram of a QLoad Report element 200 that may be used in, for example, IEEE 802.11aa. Example fields such as element ID 201, length 202, potential traffic self 203, allocated traffic self 204, and HCCA peak 207 may indicate the traffic load of the current BSS while the fields allocated traffic shared 205, enhanced distributed control access (EDCA) access factor 206, and HCCA access factor 208 may indicate the traffic load of the entire OBSS. The overlap field 209 may indicate the number of other APs that may be sharing the same channel, and whose beacon has been detected or obtained. A sharing policy field 210 and optional subelement field 211 may also be included.

Figure 3:
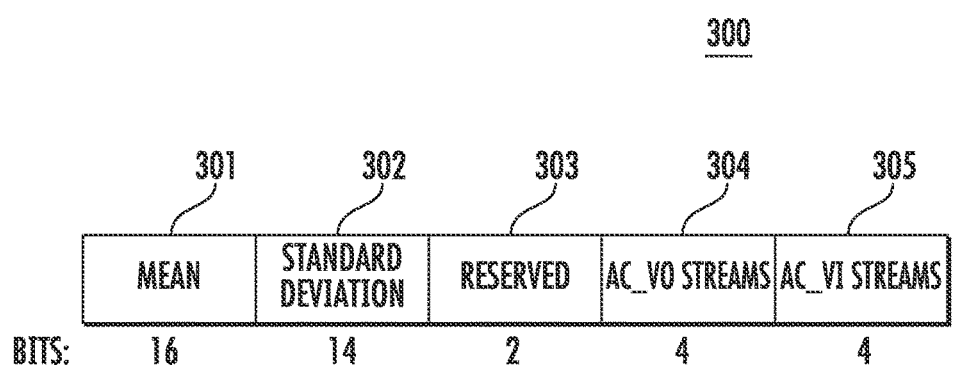
FIG. 3 is a diagram of a QLoad field format as specified by 802.11aa standards.

FIG. 3 is a diagram of an example QLoad field format 300. Fields including but not limited to potential traffic self, allocated traffic self, and allocated traffic shared may use the format of FIG. 3. The mean 301 and standard deviation 302 of traffic load may be reported in units of 32 µs. A reserved field 303 may also be included. The number of traffic streams (TS) that use an active admission control for the access categories AC_VO 304 and AC_VI 305 may be reported. The AP may request associated STAs to report QLoad Reports from other APs on the same primary channel or on other channels.

HCCA APs may cooperatively create new HCCA schedules with other HCCA APs that are collaboration candidates. For example, the HCCA APs in an OBSS may be configured to directly exchange frames without the use of a third-party STA. An HCCA TXOP Update Count element may be included in the beacon frame to indicate that an HCCA TXOP schedule has changed, for example, each time a traffic stream (TS) with an access policy HCCA or HCCA EDCA Mixed Mode (HEMM) is created or deleted.

An HCCA AP that is capable of TXOP negotiation may maintain one or more dot11APCEntry(s) for each collaboration candidate in the dot11APCTable that may indicate the schedules that the AP may avoid using when creating schedules for new TS requests. When the AP receives a new traffic specification (TSPEC) request that has an access policy equal to HCCA or HEMM, the Hybrid Coordinated function (HCF) may first examine all dot11APCEntry(s) that are present in the dot11APCTable. The AP may then send a Protected HCCA TXOP advertisement to each collaboration candidate with proposed TXOP reservation schedule.

Each collaboration candidate may examine its own scheduled TXOP as well as proposed TXOP schedules that are currently being scheduled and determine whether there is any conflict. If the received proposed TXOP does not conflict with any existing or in-progress TXOP schedule, the collaboration candidate may send a Protected HCCA TXOP response frame with the status field set to SUCCESS. If the received proposed TXOP conflicts with a scheduled TXOP, the collaboration candidate may send a Protected HCCA TXOP response frame with the status TS_SCHEDULE_CONFLICT with an alternative schedule that does not conflict with any existing TXOP schedule at the collaboration candidate. If the received proposed TXOP conflicts with any in-progress TXOP schedule, the collaboration candidate may determine based on the MAC address of the APs which proposed TXOP schedule should take priority, and the collaboration candidate may send a Protected HCCA TXOP response frame with the status TS_SCHEDULE_CONFLICT with alternative TXOP schedule or avoidance request.

An HCCA AP may not transmit an ADDTS Response frame to the requesting STA until it is reasonably certain that the proposed TXOP schedule for the TS is not in conflict with other TXOPs scheduled at collaboration candidates, for example, when the HCCA AP has received an HCCA TXOP Response frame with the status SUCCESS from all the APs to which HCCA TXOP advertisements were sent.

Figure 4:
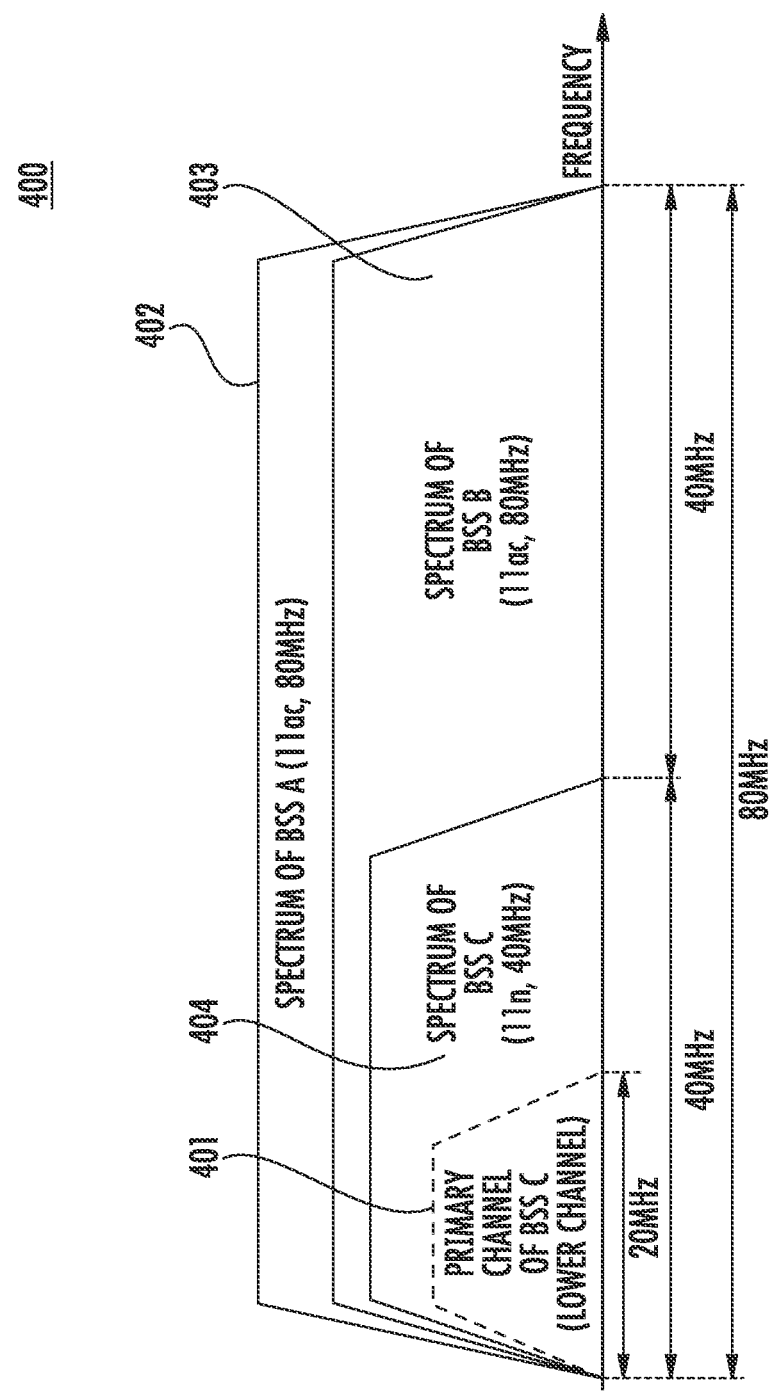
FIG. 4 is a diagram of an example channel alignment of an OBSS in 802.11ac.

FIG. 4 is a diagram of an example channel alignment 400 of an OBSS in 802.11ac. The 802.11ac standards provide rules on channel selection for an OBSS. In the example of FIG. 4, a primary channel 401, spectrum of BSS A 402, spectrum of BSS B 403, and spectrum of BSS C 404 are shown.

If an AP or a mesh STA initiates a Very High Throughput (VHT) BSS that occupies some or all channels of any existing BSS, the AP may select a primary channel of the new VHT BSS that is identical to the primary channel of any one of the existing BSSs.

If an AP or a mesh STA chooses to select a primary channel of a new VHT BSS with a 40 MHz, 80 MHz, 160 MHz, or 80+80 MHz operating channel bandwidth from among the channels on which no beacons are detected during the OBSS scans, the selected primary channel may not be identical to the secondary 20 MHz channel of any existing BSS with a 40 MHz, 80 MHz, 160 MHz, or 80+80 MHz operating channel bandwidth, and may not be overlapped with the secondary 40 MHz channel of any existing BSS with a 160 MHz or 80+80 MHz operating channel bandwidth. In one example, an AP or a mesh STA may not initiate a VHT BSS with a 20 MHz operating channel bandwidth on a channel that is the secondary 20 MHz channel of any existing BSSs with a 40 MHz, 80 MHz, 160 MHz, or 80+80 MHz operating channel bandwidth, or is overlapped with the secondary 40 MHz channel of any existing BSS with a 160 MHz or 80+80 MHz operating channel bandwidth. In another example, an AP or a mesh STA operating a VHT BSS with a 40 MHz, 80 MHz, 160 MHz, or 80+80 MHz operating channel bandwidth, on detecting an OBSS whose primary channel is of the AP or of the mesh STA secondary 20 MHz channel, may switch to 20 MHz BSS operation and/or move to a different channel.

A primary and/or secondary channel may occupy a bandwidth that is smaller or greater than that specified above. For example the primary and secondary channels may occupy 5 MHz, instead of 20 MHz.

New spectrum may be allocated in various countries around the world for wireless communication systems such as WLANs. Such spectrum may consist of channels that may be limited in size and bandwidth. In addition, the spectrum and associated channels may be fragmented, may not be adjacent, and/or may not be combined for larger bandwidth transmissions, for example, when spectrum is allocated below 1 GHz in various countries. WLAN systems built on the 802.11 standards, for example, may be designed to operate in such spectrum scenarios. Given spectrum limitations, WLAN systems may be able to support smaller bandwidths and lower data rates compared to High Throughput (HT) or VHT WLAN systems, based on, for example, the 802.11n and 802.11ac standards.

The IEEE 802.11ah Task Group (TG) has been established to develop solutions to support WiFi systems in the sub-1 GHz band. The 802.11ah TG is aiming to achieve OFDM PHY operating below 1 GHz in license-exempt bands excluding TV White Space (TVWS), enhancements to MAC to support PHY, coexistence with other systems (e.g., 802.15.4 and 802.15.4g), and optimization of rate vs. range performance (range up to 1 km (outdoor) and data rates>100 Kbit/s). Use cases including but not limited to the following are relevant to these systems: use case 1: sensors and meters, use case 2: backhaul sensor and meter data, and use case 3: extended range Wi-Fi for cellular offloading.

The spectrum allocation in some countries may be limited. For example, in China the 470-566 and 614-787 MHz bands allow 1 MHz bandwidth. Therefore, there may be a need to support a 1 MHz-only option in addition to a support for a 2 MHz with 1 MHz mode. The 802.11ah PHY may support 1, 2, 4, 8, and 16 MHz bandwidths.

The 802.11ah PHY operates below 1 GHz and is based on the 802.11ac PHY. To accommodate the narrow bandwidths required by 802.11ah, the 802.11ac PHY implementation may be down-clocked by a factor of 10. While support for 2, 4, 8, and 16 MHz may be achieved by the $\frac{1}{10}$ down-clocking, support for the 1 MHz bandwidth requires a new PHY definition with a fast Fourier transform (FFT) size of 32.

In 802.11ah, a key use case defined is meters and sensors, in which up to 6000 STAs may be supported within one single BSS. The devices such as smart meters and sensors may have very different requirements pertaining to the supported uplink and downlink traffic. For example, sensors and meters may be configured to periodically upload their data to a server which would most likely to be uplink traffic. Sensors and meters may be queried or configured by the server. When the server queries or configures a sensor and a meter, the queried data may arrive within a setup interval. The server or application may expect a confirmation for any configuration performed within a certain interval. These types of traffic patterns may be very different than the traditional traffic patterns assumed for the WLAN systems.

In the 802.11ah signal (SIG) field of the Physical Layer Convergence Protocol (PLCP) preamble of a packet, 2 bits may be used to indicate the type of acknowledgment expected as a response (i.e., ACK indication) to the packet: ACK ("00" value), block ACK (BA) ("01" value) and no ACK ("10" value). The "11" value is currently reserved.

A BSS may be sensor only, cellular offload only, or mixed. The IEEE 802.11 TGah has proposed to have sensor use the highest priority access category.

Relays may be used to extend the AP coverage and save power. 802.11ah proposed to use a non-AP relay (e.g., R-STA and R-AP) and to use four-address frames.

Two-hop relaying has been proposed for a bidirectional relay function. It may reduce power consumption on a STA with battery constraints and limited modulation and coding scheme (MCS) range. It is proposed for sharing one TXOP for a relay and a reduction in the number of contentions for channel access. Address buffer overflow at a relay with a flow control mechanism at the relay is also considered. A probe request may be used for relay discovery and information in the AP-STA link budget if available may be included to reduce the number of responses.

The IEEE 802.11 High Efficiency WLAN (HEW) Study Group (SG) has explored enhancing the Quality of Experience (QoE) for a broad spectrum of wireless users in many usage scenarios including high-density scenarios in the 2.4 GHz and 5 GHz band. Use cases which support dense deployments of APs, and STAs, and associated Radio Resource Management (RRM) technologies are being considered by the HEW SG.

Channel access issues of OBSSs with difference coverage sizes are also considered in the embodiments that follow. OBSSs of different coverage sizes may be caused by different operation bandwidth and MCS. The issue of an OBSS with different coverage sizes may be addressed in terms of sharing channels in the time domain, coordinating channel access, or modifying the 802.11 TXOP protection mechanism.

Potential applications for HEW may include emerging usage scenarios including but not limited to data delivery for stadium events, high user density scenarios such as train stations, or enterprise/retail environments, and also evidence for an increased dependence on video delivery, and wireless services for medical applications.

As used in the embodiments described herein, the term AP may be used as a general term and may include access points, a Personal BSS (PBSS) Control Point (PCP), a relay STA (R STA), a Relay AP (RAP), and the like.

As used in the embodiments described herein, the term BSS or network may be used as a general term and may include a basic service set, a PBSS, a collection of STAs that are assigned/associated/related to a relay which is referred to as a relay BSS, and the like.

As used in the embodiments described herein, the terms network of networks (NNs) and OBSS may be used as a general term and may include collections of BSS, PBSS, relay BSS, or other type of networks.

As used in the embodiments described herein, a STA may include, but is not limited to, a WTRU, an AP, or any communication device.

As used in the embodiments herein, TXOP may be defined as a general concept to refer to TXOP, beacon subinterval, restricted access window (RAW), periodic RAW (PRAW), target wake time (TWT), restricted window (a window during which only certain types of STAs may access the medium, such as 802.11ac STAs, HEW STAs, or legacy STAs), access windows, etc., which may occur over different frequency channels and bandwidths and/or transmission sectors. TXOP as defined above may be periodic or may be allocated for a single time duration. Similarly, RAW may include PRAW, TXT, access window or restricted window. A "/" may be used herein between these terms to mean "or." For example, in the embodiments that follow, "TXOP/RAW/PRAW/TWT/beacon subinterval schedules/restricted window/access window" refers to "TXOP, RAW, PRAW, TWT, beacon subinterval schedules, restricted window, or access window."

Figure 5:
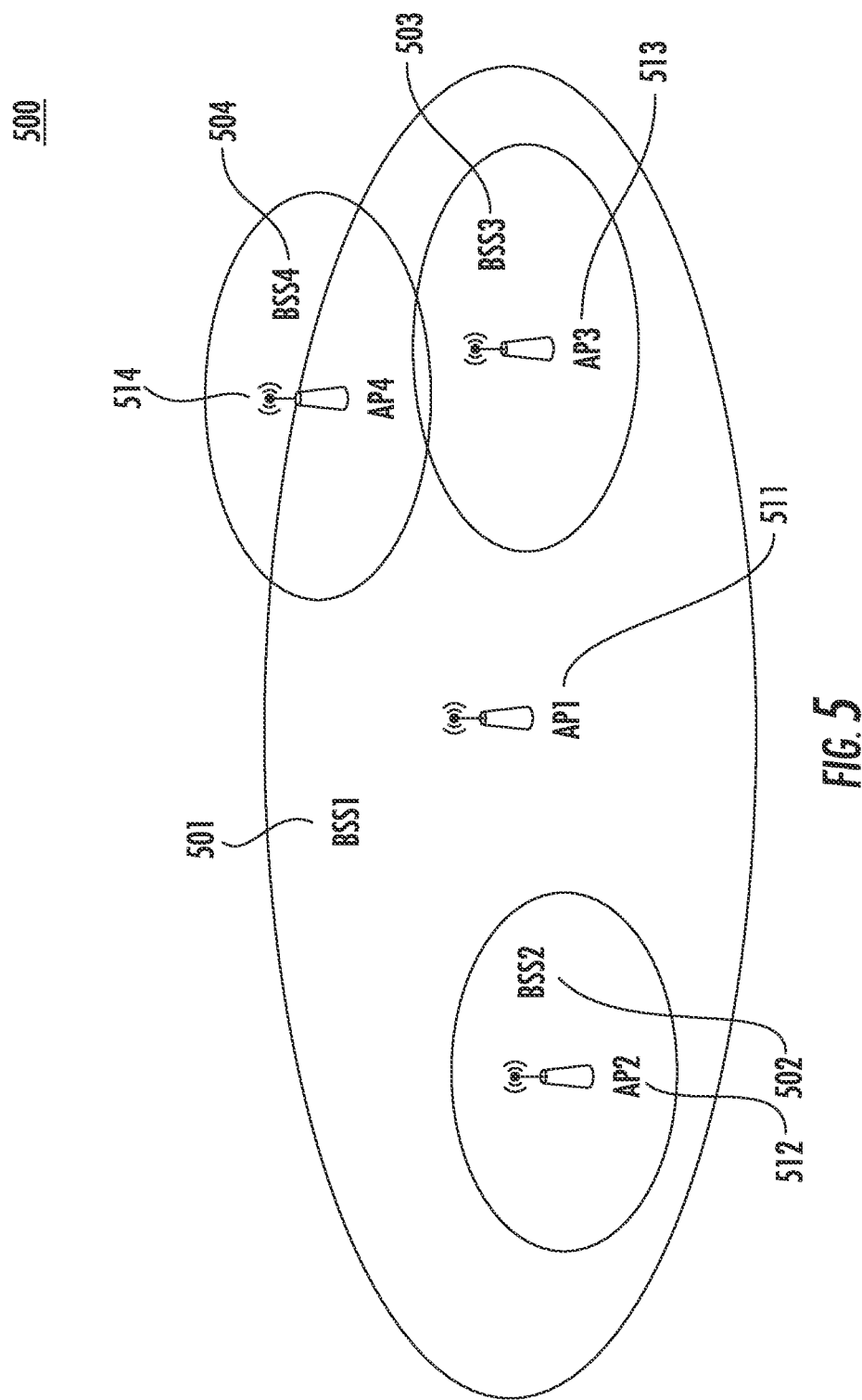
FIG. 5 is a diagram of an example network of networks (NN) and overlapping basic service set (OBSS)

FIG. 5 is a diagram of an example network of networks (NN) and OBSS 500. In FIG. 5, BBS1 501 may be a long range BSS and include AP1 511. BSS2 502 including AP2 512, BSS3 503 including AP3 513, and BSS4 504 including AP4 514 may be of relatively shorter range. BSS1 501 may be an 802.11ah BSS with a narrow bandwidth of 1 MHz or a BSS conforming to another 802.11 standard or wireless standard (e.g., LTE, WiMAX, etc.) with higher transmit power. BSS2 502, BSS3 503, and BSS4 504 may be an 802.11ah BSS with a wider operation bandwidth of 2 MHz and above, or may be BSSs conforming to another IEEE 802.11 standard or other wireless standards with lower transmit power.

In FIG. 5, the BBS1 501, BSS2 502, BSS3 503, and BSS4 504 may experience interference from each other if they operate on frequency channels that are at least partially overlapping. BSS2 502 and BSS3 503 may be geographically completely contained within BSS1 501 while BSS4 504 may be partially overlapping with BSS1 501 and BSS3 503.

NNs such as in the example of FIG. 5 may have different degrees of overlap. STAs in different networks or in different parts of the same network may experience different levels of interference or may compete for medium access with different numbers of STAs given the different degrees of overlap of their BSS.

Figure 6:
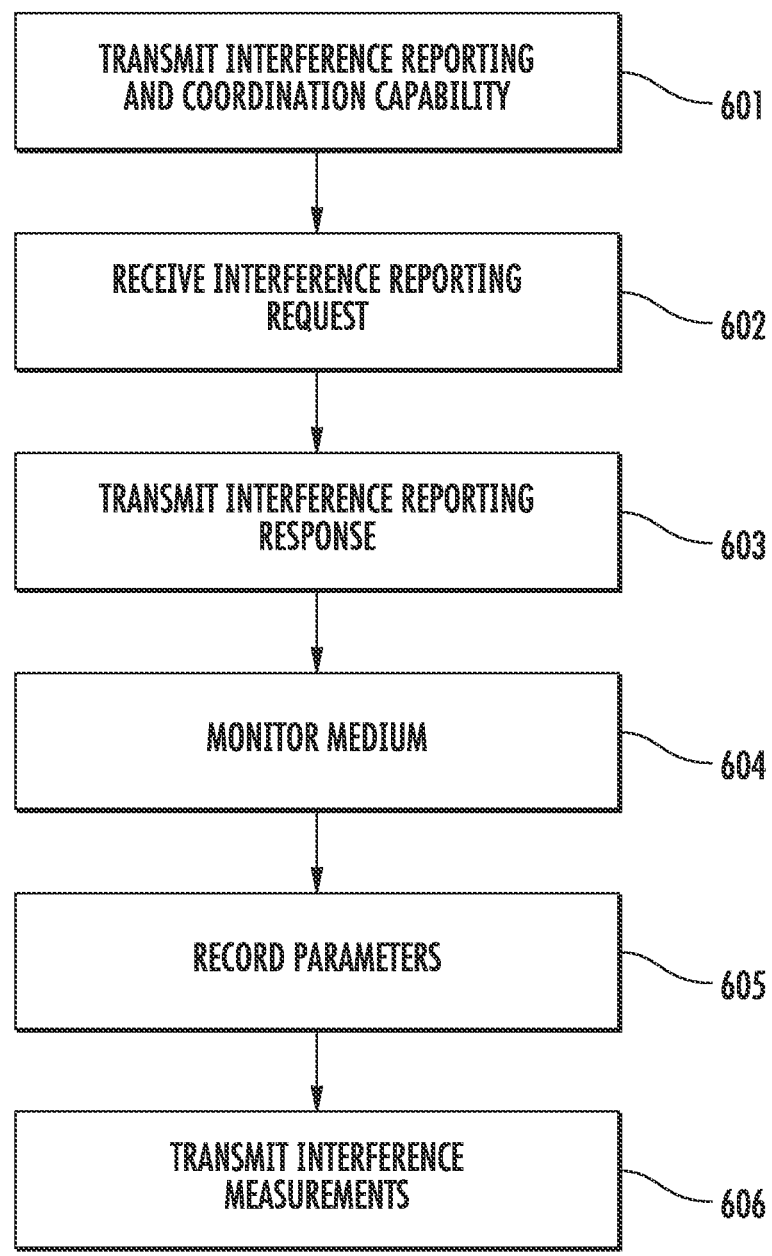
FIG. 6 is a flow chart of an example procedure in which STAs or APs may report interference.

FIG. 6 is a flow chart of an example procedure in which STAs or APs may report interference 600 in accordance with a first embodiment, which may be used in combination with any of the embodiments described herein. In this embodiment, in order to share resources and coordinate QoS settings, STAs or APs may detect and report the medium occupancy and the traffic in other BSSs that they observed enabling them to accurately report issues related to the overlapping of the BSS. In this example, a STA may indicate its reporting capabilities by transmitting an interference reporting and coordination capability 601 information element (IE) within a frame to an AP. The STA may then receive an interference reporting request 602 from an AP. The interference reporting request may be transmitted in a frame or IE referred to as the interference reporting request IE. The frames containing the interference reporting request IE may be transmitted to another STA directly, through a relay/mesh STAs, or other type of interface. These frames may be transmitted to one or more STAs using uni-cast, multi-cast, or broadcast addresses. The interference reporting request IE, or any subset of the subfields thereof, may be implemented as a subfield or subsets of subfields of any conventional or new IE, or as a part of any control, management or other type of frames or in MAC/PLCP headers.

The STA may then transmit an interference reporting response 603 to the AP. The interference reporting response may be contained within an interference reporting response IE. The interference reporting response frame or a frame containing an interference reporting response IE may include the status code SUCCESS when accepting the interference reporting request. Alternatively, it may respond with the status code UNKNOWN or REJECT if the STA is not capable of interference reporting or to reject the request. Similarly, the interference reporting response frame may be transmitted to the requesting AP or STA directly or through a relay or mesh STAs or other type of interface. The interference reporting response may contain a sequence number that may be provided in the corresponding interference reporting request that was received.

The STA and then monitor the medium 604, which may be a wireless medium, and record parameters 605 associated with the medium. The STA may then transmit the interference measurements 606 including the recorded parameters to the AP. The interference measurements may be transmitted in an interference measurement IE. The example procedure of FIG. 6 as described above may be performed by the STA or AP multiple times or in multiple rounds as well after the STA and AP have exchanged reporting and coordination capabilities.

In another example, the AP may send an interference reporting request frame to a relay STA to request the relay of the relay STA BSS to conduct interference reporting. The relay STA may subsequently request all STAs associated with it to conduct interference reporting and respond to the AP with SUCCESS in its interference reporting response frame after all STAs or at least some number of STAs have responded with an interference reporting response of SUCCESS.

In another embodiment, a centralized control device, (such as an admission controller or an AP), may conduct coordination for the networks, such as BSS, PBSS, relay BSS, etc., in an area. Such a centralized control device may transmit interference reporting request frames to APs, STAs, PCPs, RAPs, or RSTAs to request that they and/or their networks conduct interference measurements including monitoring their respective medium and recording parameters associated with their respective medium.

When a STA accepts the interference reporting request or when a STA has indicated that it may be interference reporting capable (for example, when dot11InterferenceReportingEnabled is true), as described above, the STA may monitor the medium for a period of time (e.g., as specified in the interference reporting request) on the frequency channel and bandwidth requested. Such a monitoring period may be a sliding window and the STA may conduct monitoring at any given time when it is awake.

During the measurement period, the STA may record medium occupation time by one or more STAs. While a STA performs the measurements in the example that follows, it may also be performed by a relay STA or AP. All medium occupation time used by the STA or a set of STAs, for example, the medium occupation time by a BSS or a relay BSS may be the transmission time of all packets that contain the MAC address or the BSSID of the AP or the relay STA in the MAC/PLCP header as well as the associated ACKs, Block ACKs (BAs), and other response frames such as null data packet (NDP) frames. The medium occupation time may or may not include the inter frame spacing such as SIFS, DIFS, etc. A STA or any measuring STA/device may also measure medium occupation time by one or more relay STAs by measuring the transmission time of all packets with a four-address format include the MAC address of a relay STA.

The STA may also record interference time. This time may be measured of the average duration of periods in which PHYCCA.indication(busy) is detected, but no valid packets were decoded. The interference time may also include Extended Interframe Space (EIFS) times associated with PHYCCA.indication(busy). The STA may also record average medium access time for ACs (the average time before the measuring STA may gain access to the medium for the packets of different ACs). The monitoring STA may also monitor the broadcast beacons, short beacons or any control and management frames received from all relay STAs, RAPs, PCPs, APs, etc. and record the announced parameters as requested such as QoS settings (such as EDCA parameters for different ACs), frequency channel and bandwidth usage and reservations, beacon subinterval/restricted access window (RAW)/PRAW/TWT/restricted window/access windows reservations announced, announced number of positive TIM indications as well as coordination capabilities.

As described above, the monitoring STA may then report the measured interference to a coordinating STA, such as a centralized controller or AP, or relay STAs, or the requesting STA, etc., according to frequency and methods specified in the interference reporting request. The STA may use a frame containing the interference measurement IE for this report.

Figure 7:
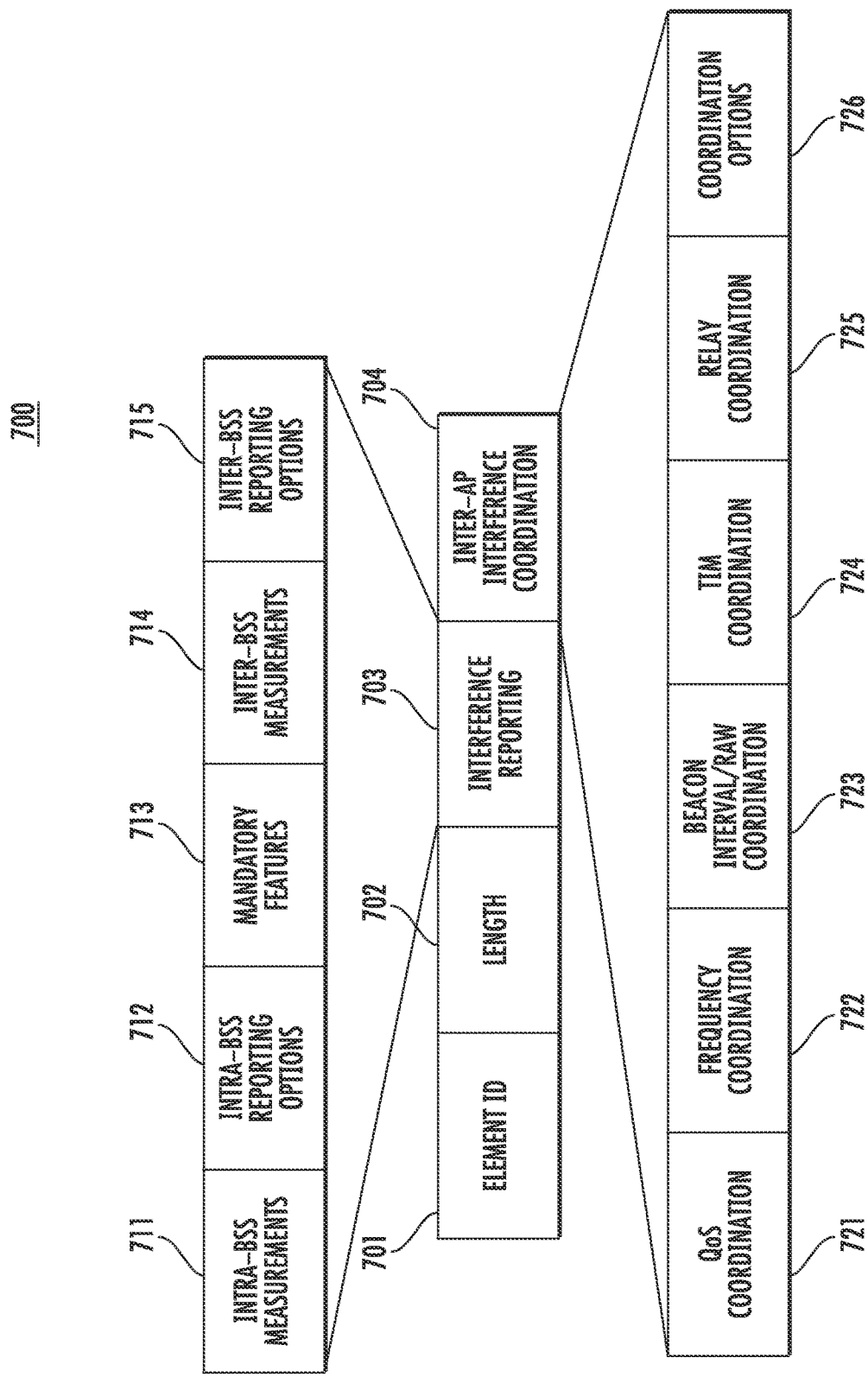
FIG. 7 is a diagram of an example format of an interference reporting and coordination capability information element (IE)

FIG. 7 is a diagram of an example of an interference reporting and coordination capability information element (IE) 700 that may be used when STAs and APs indicate their capability of interference reporting as well as other inter-BSS reporting and coordination capabilities. For example, APs and STAs including relay STAs, PCPs, etc. may use the interference reporting and coordination capability IE for this purpose.

The interference reporting and coordination capability IE may include but is not limited to an element ID field 701, length field 702, interference reporting capability field 703, and an inter-AP interference coordination capability field 704. The element ID field 701 may be a field containing an ID indicating that the current IE is an interference reporting and coordination capability IE. The length field 702 may be a field containing the length of the interference reporting and coordination capability IE.

The interference reporting capability field 703 may be used to indicate the capability of interference measurement and reporting and may contain the following subfields: intra-BSS measurements 711, intra-BSS reporting options 712, mandatory features 713, inter-BSS measurements 714, and inter-BSS reporting options 715.

The intra-BSS measurements field 711 may be used to indicate the capability of measuring interference and medium occupation time for intra-BSS transmissions. This field may include a bit map or other type of encoding to indicate that the transmitting STA is capable of measuring the following parameters: medium occupation time by another STA or another set of STAs in the same BSS (such as a relay STA, a relay BSS, a PBSS, a group of STAs identified by a group ID, or a set of STAs identified by a sector ID) and interference time. The interference time may be a measurement of the average duration of periods in which PHYCCA.indication(busy) is detected, but no valid packets were decoded. The interference time may include EIFS times associated with PHYCCA.indication(busy).

The intra-BSS reporting options field 712 may be used to indicate the options for reporting intra-BSS interference and medium occupation, such as directly to AP/PCP, directly to relay STA, via a relay STA to AP, using DLS/TDLS to one or more relay STAs and AP, or using Robust Security Network Association (RSNA)-established mode to one or more relay STAs and AP, etc.

The mandatory features field 713 may be used for AP/relay STA/PCP to specify the mandatory features for interference reporting and coordination that a STA may support to be able to associate with the AP/relay STA/PCP. This field may be implemented as a bitmap.

The inter-BSS measurements field 714 may include medium occupation time by another STA or another set of STAs in a different BSS (such as an AP, a relay STA, an AP and all the STAs that are associated with the AP, a relay STA and all STAs that are associated with the relay STA, a PBSS, a group of STA identified by a group ID, a set of STAs identified by a sector ID, etc.). The Inter-BSS Measurements field 714 may include an interference time. The interference time may be a measurement of the average duration of periods in which PHYCCA.indication(busy) is detected, but where no valid packets were decoded. The interference time may include EIFS times associated with the detected interference. The Inter-BSS Measurements field may include QoS settings for different access categories advertized by different AP/relays, frequency band usage measured and advertized by different APs/relays, beacon interval/RAW/PRAW/TWT/restricted window or other access windows detected or announced by APs/Relays, and/or TIM or UL access windows announcement announced by APs/Relays.

The inter-BSS reporting options field 715 may be used for several purposes. In one example, it may indicate the options for the STAs to report the inter-BSS observations and measurements to the AP. In another example it may also indicate the options for the transmitting AP/relay/PCP to report its own parameters to a neighboring AP/relay/PCP.

The options for the STAs to report measured or observed inter-BSS transmissions and interference may include but are not limited to direct to AP/Relay/PCP, through relay to AP/Relay/PCP, using DLS/TDLS to one or more relay STAs and AP, using an RSNA-established mode to one or more relay STAs and AP, using scheduled reporting, or reporting when a change is detected.

The options for the AP/relay/PCP to report its own parameters to neighboring AP/relay/PCP may include but are not limited to active reporting (the transmitting AP/Relay/PCP may actively report its own parameters for QoS, frequency band usage, beacon interval/RAW/PRAW/TWT/access window assignment, TIM and other information to neighboring AP/Relay/PCPs directly), broadcast announcement (the transmitting AP/Relay/PCP may include its own parameters in selected or all beacons, short beacons, or other type of broadcast control and management frames), reporting schedule (a schedule for transmitting frames reporting the parameters of the AP/Relay/PCP), and/or using a reporting method to transmit information to a different AP/Relay/PCP, such as using DLS/TDLS, an RSNA-established mode, through a distribution system, or other interface such as Ethernet, WiMAX, LTE, etc.

The inter-BSS coordination capability field 704 may be used to indicate the inter-BSS coordination capabilities. For example, the coordination capability may indicate QoS coordination 721. The transmitting AP/relay STA/PCP may be able to coordinate QoS settings and parameters with neighboring AP/relay STA/PCP/networks, and this capability may be indicated in the inter-BSS coordination capability field 704.

The coordination capability may also indicate frequency coordination 722. The transmitting AP/relay STA/PCP may be able to coordinate QoS settings and parameters with neighboring AP/relay STA/PCP/networks. The frequency coordination may be dynamic primary channel coordination or dynamic operation channel bandwidth coordination and reservation. The transmitting AP/relay STA/PCP may be able to dynamically adjust its primary channel through frequency coordination. The transmitting AP/relay STA/PCP/network may be able to dynamically adjust and reserve channel bandwidth through frequency coordination.

The coordination capability may indicate beacon subinterval/RAW/PRAW/TWT/coordination 723. The transmitting AP/relay STA/PCP may be able to coordinate and reserve beacon interval/RAW/PRAW/TWT/access window parameters with neighboring AP/relay STA/PCP/networks through coordination.

The coordination capability may also indicate TIM coordination 724. The transmitting AP/relay STA/PCP may be able to coordinate the number of positive TIM indications with neighboring AP/relay STA/PCP/networks through coordination.

The coordination capability may also indicate relay coordination 725. The transmitting AP/PCP may be able to conduct coordination on behalf of the relay STAs/RAPs that are associated with the AP/PCP.

Finally, multiple coordination options may be indicated in a coordination options field 726 including centralized/distributed coordination, direct to different AP/Relay/PCP, through relay STA to different AP/Relay/PCP, through a non-relay STA to different AP/Relay/PCP, using DLS/TDLS to one or more relay STAs and AP, using an RSNA-established mode to one or more relay STAs and AP, and/or using coordination relaying capability (the transmitting STA may be capable of relaying coordination information through itself to another STA).

The interference reporting and coordination capability IE or any subset of the subfields thereof may be implemented as a subfield or subsets of subfields of any IE, or as a part of any control, management or other type of frame or in MAC/PLCP headers. For example, one or more coordination capabilities may be a part of a High Efficiency WLAN (HEW) capability IE and/or HEW Operation IE.

A STA may also include the interference reporting and coordination capability IE in its probe request, association request, or other types of frames to specify its interference reporting capabilities and coordination capabilities (such as capable of relaying coordination information to another STA). This may also be implied through another capability other than the IE detailed above, a STA class type, or an indication to the AP.

An AP, relay STA, RAP, or PCP may include the interference reporting and coordination capability IE in its beacon, short beacon, probe response, association response or other type of frames to announce that its own capabilities as well as interference reporting features that a STA may have to have in order to associate with it.

Figure 8:
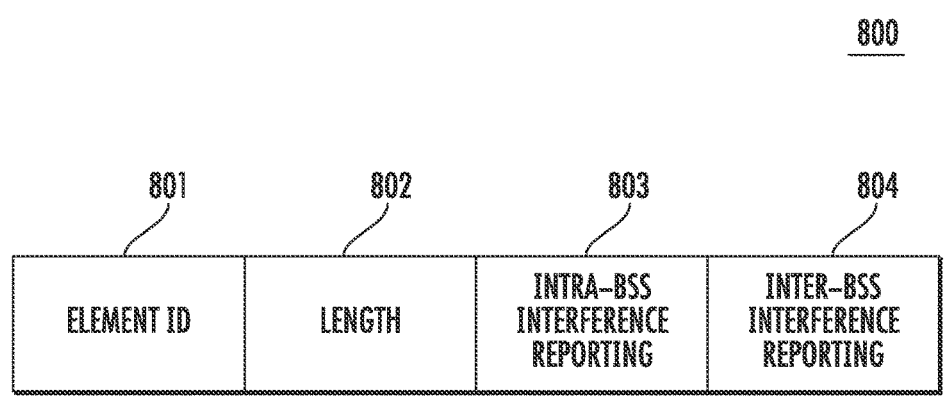
FIG. 8 is a diagram of an example format of an interference reporting request IE.

FIG. 8 is a diagram of an example of an interference reporting request IE that may be used when STAs and APs request one or more STAs to conduct interference reporting 800. For example, an AP, relay STA, RAP or PCP may request using frames that contain an interference reporting request IE that one or more STAs, a group of STAs that indicated that they are capable of interference reporting (e.g., in frames such as probe request, association request or other control and management frames) may be identified by a group ID to conduct interference reporting. The interference reporting request IE may contain but is not limited to the following fields: element ID field 801, length field 802, intra-BSS interference reporting field 803, and inter-BSS interference reporting field 804.

The element ID field 801 may be an ID indicating that the current IE is an interference reporting request IE. The length field 802 may contain the length of the interference reporting request IE.

The intra-BSS interference reporting field 803 may be used to specify the measurement for intra-BSS interference requested. The inter-BSS interference reporting field 804 may be used to specify the measurement for inter-BSS interference.

Figure 9:
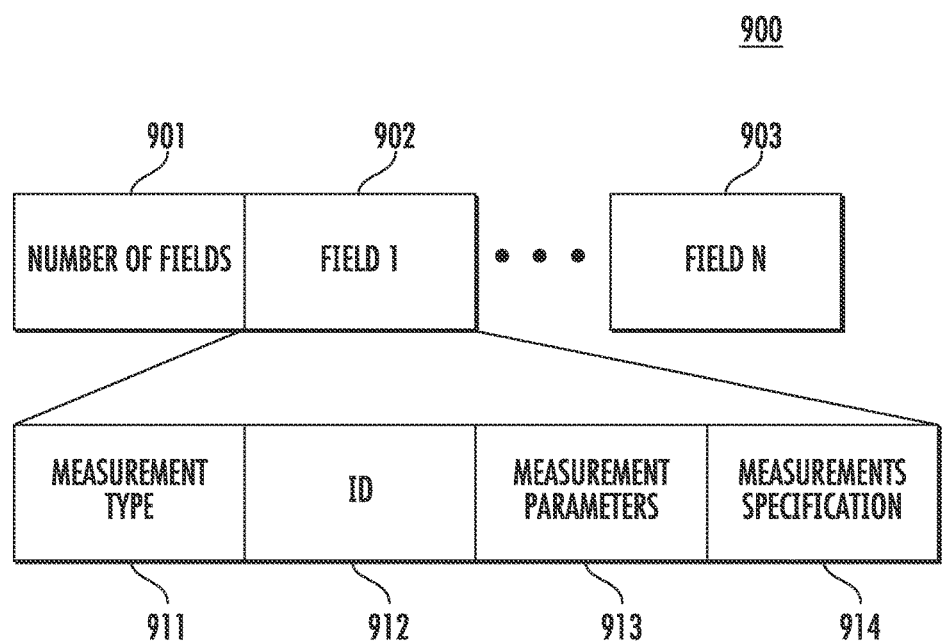
FIG. 9 is a diagram of an example format of an intra-BSS and inter-BSS interference reporting fields.

FIG. 9 is a diagram of an example format of an intra-BSS interference reporting field and inter-BSS interference reporting field 900. The intra-BSS interference reporting field may include but is not limited to the following subfields: number of fields 901 and field 1 902 . . . Field N 903. The number of fields 901 subfield may be used to specify the number of fields that may be contained in the intra-BSS interference reporting field. The number of fields 901 may also include a sequence number identifying the sequence of the interference reporting request.

Each of the field 1 902 through field N 903 subfields may contain information on a specific requested measurement including measurement type subfield 911, ID subfield 912, measurement parameters subfield 913, and measurement specification subfield 914.

The measurement type subfield 911 specifies, for example, whether the STA being requested should measure for a single STA or a set of STAs, such as a group of STAs identified by a group ID, a PBSS, or a set of STAs that may include a relay STA and all STAs that are associated with the relay. Some potential values may include but are not limited to: STA, BSS, relay STA, relay BSS, PBSS, PCP, etc.

The ID subfield 912 may be used to specify the target STA or the set of STAs of the requested measurement. The ID subfield 912 may contain a MAC address, an association identifier (AID), a group ID or any other type of IDs that the STAs and the APs agreed upon or a combination thereof. The ID field may also contain a wildcard MAC address to request that the STA being requested measure all relevant transmissions. For example, if an AP requests a STA to measure all relay BSSs (the set of STAs including a relay STA as well as all STAs that are associated with the relay STA), it may set the measurement type subfield to relay BSS and set the ID field to the wildcard ID.

The measurement parameters subfield 913 may indicate the parameters that the STA being requested should measure. The parameters for this may include but are not limited to the medium occupation time by another STA or another set of STAs in the same BSS, (such as a relay STA, or a relay STA and all the STAs that are associated with the relay STA, a PBSS, a group of STA identified by a group ID). The parameters may include an interference time. The interference time may be a measurement of the average duration of periods in which a PHYCCA.indication(busy) is detected, but where no valid packets were decoded. The interference time may also include EIFS times associated with PHYCCA.indication(busy). The parameters may include an average medium access time for ACs (e.g., the average time before the measuring STA can gain access to the medium for the packets of different ACs).

The measurement specifications subfield 914 may provide specifications for the measurement that should be conducted. The specifications may include measurement channel and bandwidth. The requesting STA may specify the channel numbers and bandwidth for which the measurement should take place. The specifications may specify whether a relay STA may forward measurement requests to the AP including an indication of the requester STA ID or a STA group ID. The specifications may specify measurement frequency. The measurement frequency may be once (the measurement should take place once), periodic (the measurement should take place periodically for certain durations), or scheduled (the measurement should take place according to a schedule provided, for example, for a given beacon subinterval, or a RAW or access window duration), or when a change is detected. The specifications may specify reporting frequency (the measurements may be reported with the given or requested frequency).

The inter-BSS interference reporting field may use the format for the intra-BSS interference reporting field shown in FIG. 9 with the following exception: in addition to the parameters presented for the measurement parameters for intra-BSS interference, the measurement parameters subfield may indicate more parameters that the STA being requested should measure including, but not limited to: QoS settings for different access categories advertized by different APs/relays, frequency band usage measured and advertized by different APs/relays, beacon subinterval/RAWs/PRAWs/TWTs or other access windows detected or announced by APs/Relays, TIM/UL access window announced by APs/Relays, and/or coordination capabilities announced by APs/Relays/PCPs.

Figure 10:
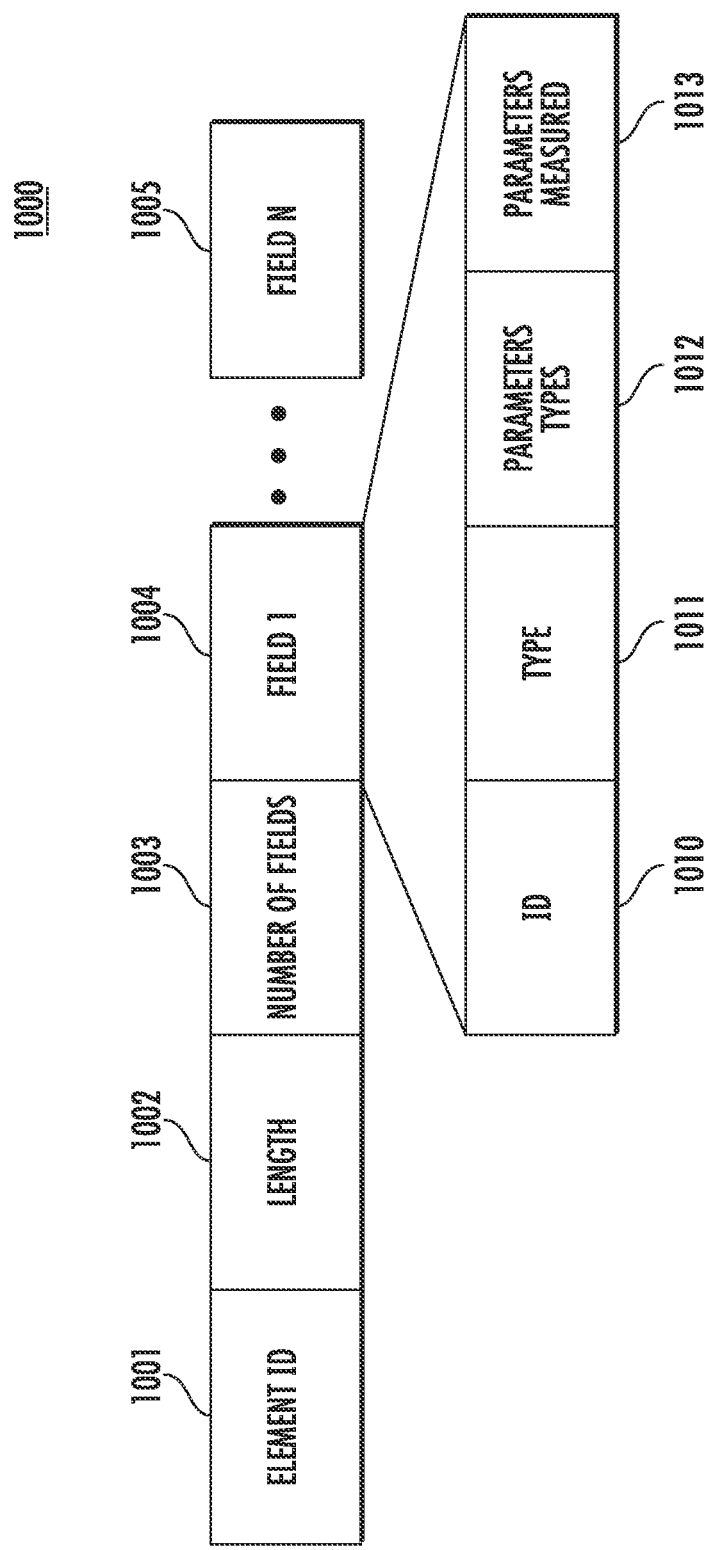
FIG. 10 is a diagram of an example format of an interference measurement IE.

FIG. 10 is a diagram of an example format of an interference measurement IE that may be used by STAs or APs to report measurements 1000. The interference measurement IE may contain but is not limited to the following fields: element ID field 1001, length field 1002, number of fields field 1003, and field 1 1004 through field N 1005.

The element ID field may indicate that the current IE is an interference measurement IE. The length field 1002 may contain the length of the interference measurement IE. The number of fields field 1003 may be used to specify the number of fields contained in the interference measurement IE. Additionally, the number of fields field 1003 may include a sequence number. The sequence number may correspond to the sequence number included in the interference measurement request from the requesting STA/AP. Alternatively, the sequence number may be related to time or number of reports that the reporting STA/AP transmits or has transmitted.

Each of the field 1 1004 through field N 1005 fields may contain measured interference and parameters of one or more STAs and may contain the following subfields: ID subfield 1010, type subfield 1011, parameters types subfield 1012, and parameters measured subfield 1013.

The ID subfield 1010 may be used to specify the target STA or the set of STAs of the requested measurement. The ID subfield 1010 may also contain a MAC address, an AID, a group ID or any other type of IDs that the STAs and the APs agreed upon. If a reporting STA is reporting its own parameters and medium occupation times, the ID field may be set to the ID of the STA, such as MAC address, AID, etc.

The type subfield 1011 may specify the type of measured interference. The measured interference may be for a single STA, or a set of STA, such as a group of STAs identified by a group ID, a PBSS, or a relay BSS. Some potential values may be: STA, BSS, relay STA, relay BSS, PBSS, or PCP. For example, a BSS may be identified by the combination of ID field set to the BSSID and the Type set to BSS. A group of STAs may be identified by the combination of the ID field set to a group ID and the Type set to Group. In another example, a relay BSS may be identified by a combination of ID field set to the BSSID of the relay BSS or the MAC address of the relay AP/STA and the Type field set to the Relay BSS.

The parameters types subfield 1012 may be used to specify the type of measured parameters contained in the parameters measured subfield 1013. Multiple types of parameters may be included in the parameters measured subfield 1013. The indication of the types of the parameters may be encoded as a bitmap or other type of encoding to indicate multiple parameters types, such as medium occupation time, interference time, QoS settings and loads, frequency channel usage and reservations, announced reservation of beacon subintervals/RAW/PRAW/TWT/access windows, number of positive TIM indications, or TXOP as generally defined above.

The parameters measured subfield 1013 may include the values of the parameters measured by the reporting STA. The exact types of the parameters reported may be indicated in the parameters types subfield, such as medium occupation time, interference time, QoS settings and loads, frequency channel usage and reservations, announced reservation of beacon subintervals/RAW/PRAW/TWT/access windows or number of positive TIM indications.

The interference measurement IE, or any subset of the fields and subfields thereof, may be incorporated as a subfield, or subsets of subfields, of any IE, or as a part of any control, management or other type of frames or in MAC/PLCP headers.

In another embodiment, the relay STAs/PCPs/APs/RAPs/STAs may report their own parameters such as medium occupation time and other settings using a frame containing the interference measurement IE to other relay STAs/PCPs/APs/RAPs/STAs or to a central coordinating device, such as a coordinator in a carrier-controlled or enterprise WLAN networks in order to conduct coordination.

In another example, relay STAs may send the parameters of their own relay BSSs to the root AP so that the root AP may be able to conduct coordination among the relay BSSs and surrounding BSSs. In such a case, each field may be used to report the transmitting STA or their BSSs medium occupation time and other settings that are impacting a particular BSS or network. The ID subfield may be used in this case to indicate the network or STA that is impacted by the amount of load and parameters provided in this field.

In another embodiment, STAs may be grouped based on visibility to multiple networks and capabilities. An AP/relay STA/PCP/RAP may divide STAs that are associated with them into groups based on the visibility by the STAs to multiple networks and capabilities. For example, if a set of STAs in a BSS or a relay BSS are overlapping with the same set of BSS's or similar set of BSS's, the set of STAs may be grouped together. Such a group of STAs may be referred to as an interference group (IG). An AP may divide the STAs that are associated with it into multiple IGs, and the AP may coordinate with the overlapping BSSs and provide different settings such as QoS settings, TXOP/RAW/PRAW/TWT/beacon subinterval schedules, TIM/UL access window assignment, or TXOP as generally defined above for different IGs depending on the negotiation and coordination with the respective overlapping BSSs.

In another example, an AP/RAP/PCP/relay STA may group the STAs associated with it based on the operating bandwidth capabilities and settings of the STAs. For example, the AP/RAP/PCP/relay STA may divide STAs that operate using only 1 MHz bandwidth into Group 1, STAs that can operate using up to 2 MHz bandwidth into Group 2, STAs that can operate using up to 4 MHz bandwidth into Group 3, and STAs that can operate up to 8 MHz bandwidth into Group 4. Similar divisions may apply for STAs that are capable of 80 MHz bandwidth, 20 MHz bandwidth, 160 MHz bandwidth, or 80+80 MHz bandwidth. Grouping of STAs may also be based on complementary capabilities. For example, if operation bandwidth of a network is 160 MHz; the AP/RAP/PCP/Relay STA may group two STA capable of 20 MHz bandwidth, one STA capable of 40 MHz bandwidth and one STA capable of 80 MHz together to conduct simultaneous 160 MHz bandwidth transmissions. Different groups of STAs may be assigned to different TXOPs/RAWs/PRAWs, other access windows, or TXOP as generally defined above that may span different bandwidths. Such assigned TXOPs/RAWs/PRAWs/or other access windows may be negotiated with neighboring networks such that the resources may be optimally shared through coordination among overlapping networks.

In yet another embodiment, STAs may be divided into groups based on their feedback on the channel conditions. If, for example, a set of STAs have all indicated to an AP or RAP that they prefer to use Channel i (e.g., by sending a frame on Channel i, or by providing detailed channel condition feedback), the set of STAs may be assigned to IGi. Similarly, different groups of STAs may be assigned to different RAWs/PRAW/TWT, and may span different bandwidths or may communicate on different channels. Such assigned RAWs/PRAW/TWT/access windows may be negotiated with neighboring networks such that the resources may be optimally shared through coordination among overlapping networks.

Such group assignments as described above may be based on the interference measurement reports by the STAs. The group assignments may be announced through modified versions of the group ID management frames. For example, the number of group IDs may be extended to 128 or 256 or more. Some of the group IDs may be reserved for interference groups.

When there is a dense deployment of APs and BSSs in an area, especially when BSSs are designed for different applications, quality of service (QoS) requirements associated with different access categories (ACs) may not be satisfied across the OBSS. The coordination mechanisms that address other ACs of traffic or traffic patterns beyond only voice and video streams may enable QoS requirements to be met.

Figure 11:
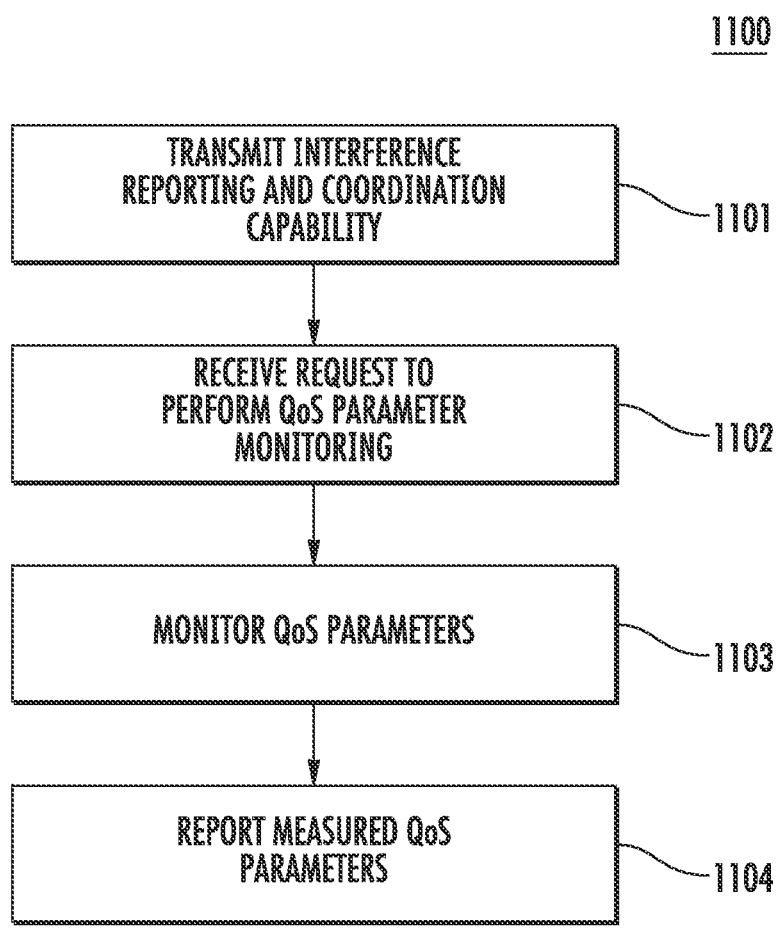
FIG. 11 is a flow chart of an example procedure in which QoS setting may be coordinated for different BSSs to ensure that QoS requirements are met.

FIG. 11 is a flow chart of an example procedure for monitoring and measuring QoS settings for different BSSs to ensure that QoS requirements are met in accordance with a second embodiment 1100, which may be used in combination with any of the embodiments described herein. A STA may transmit its interference reporting and coordination capability 1101 and then may receive a request to perform QoS parameter monitoring 1102. The interference reporting and coordination capability IE may be used by the STA to transmit its interference reporting and coordination capability. The STA may then monitor QoS parameters 1103 and report the measured QoS parameters 1104. The example procedure of FIG. 11 may be performed by the STA or AP multiple times or in multiple rounds as well after the STA and AP have exchanged interference reporting and coordination capabilities.

A relay STA/AP/RAP/PCP may include the interference reporting and coordination capability IE in its beacon, short beacon or other type of control, management, or extension frame to indicate that it is capable of reporting QoS parameters, load and/or QoS setting coordination. A relay STA/AP/RAP/PCP that is capable of QoS parameter reporting and/or QoS setting coordination may announce its own QoS load and parameters in their beacons, short beacons, other multi-cast, broadcast frames, or uni-cast frames to some centralized coordination device, or to other relay STAs/APs/RAPs/PCPs/STAs/networks.

In accordance with the procedure of FIG. 11, when a STA has specified in its probe request, association request, or other control or management frames that it is capable of interference reporting, (e.g., QoS related parameter monitoring or reporting), a relay STA/AP/RAP/PCP may request such a STA to conduct QoS parameter monitoring. The STA may then monitor the QoS parameters of neighboring networks (such as BSS, PBSS, relay BSS, etc.) and report the observed QoS parameters to their RAP/PCP/AP. The RAP/PCP/AP may collects the QoS load information and parameter setting for their own network, as well as the QoS load information and parameters observed from other networks that overlap with its own network. If necessary, the collection of all QoS load information and parameters may be forwarded to a device that is capable of QoS coordination, such as, for example, a centralized coordination AP.

In another example application of the procedure of FIG. 11, STAs in a relay BSS within the same BSS may monitor the QoS load and parameters of all relay BSSs and BSSs that they may overhear. The STAs may then report the measured interference to their respective RAPs/APs. The RAPs/APs may then collect QoS load and parameters within their own relay BSS as well as the overlapping networks. This information may then be forwarded to the root AP. In addition, the root AP may forward the relevant QoS load and parameters to the APs/RAPs of the overlapping networks. For example, if a set of STAs in an interference group IG1 overlaps with another network BSS1, then the AP may need to forward the QoS load and parameter settings to the AP of BSS1. The APs may then negotiate a set of appropriate QoS parameters based on the total QoS load in the overlapping networks. The APs may also independently determine their own QoS parameters based on the total QoS load and the QoS parameters used by the overlapping networks.

In another embodiment in accordance with the procedure of FIG. 11, all RAPs/PCPs/APs may forward the QoS load and parameters for their own network as well as overlapping networks to a centralized coordination device, such as a coordination AP in an enterprise or carrier operated network. The coordination device may determine the appropriate QoS settings for all networks such as BSS/PBSS/relay BSS/IGs.

The QoS Load information shown in FIG. 2 may be expanded to include more information than AC_VO and AC_VI loads. When used by a STA/Relay STA/AP/PCP/RAP to report its own QoS setting and loads, the parameters measured subfield in the interference measurement IE shown in FIG. 10 may include a subset or all subfields shown in FIG. 2.

Figure 12:
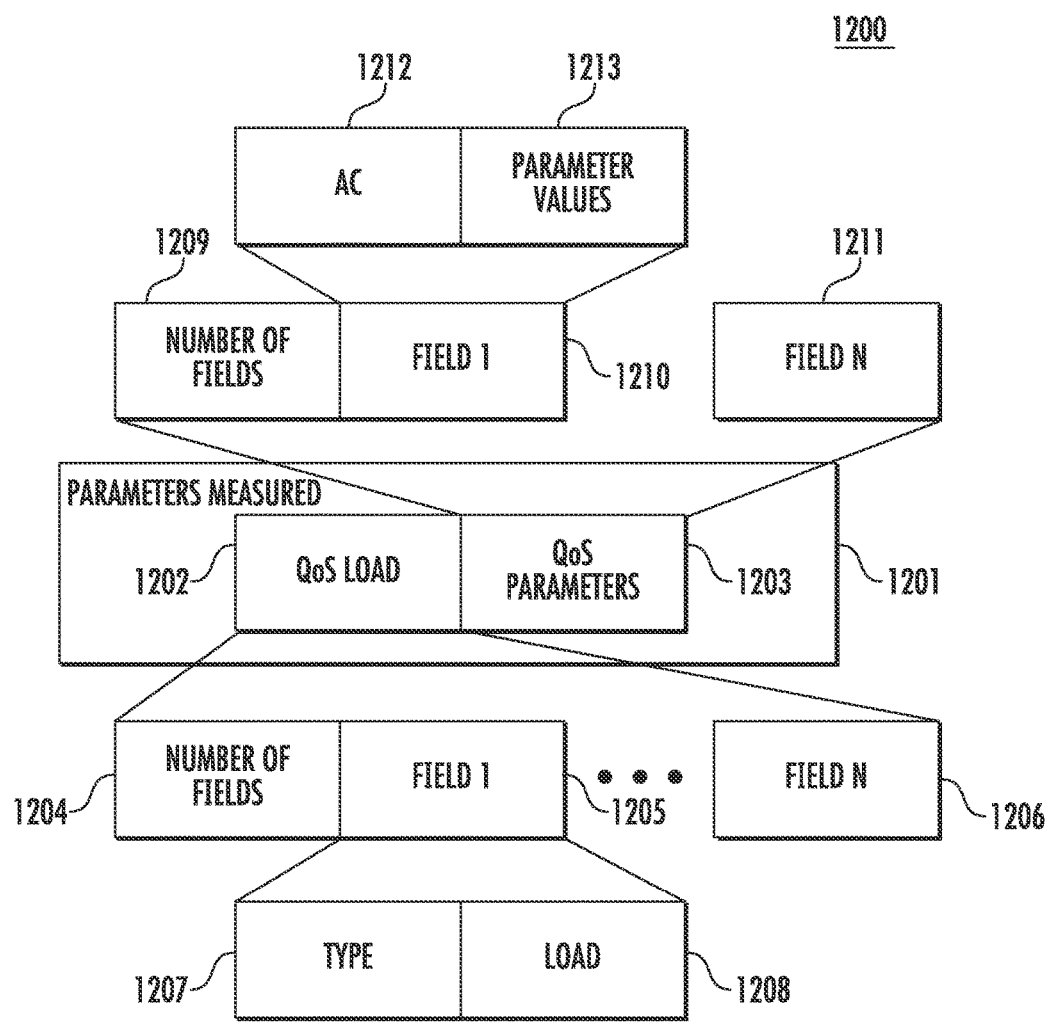
FIG. 12 is a diagram of an example format of the QoS parameter and load fields in the parameter measured subfield.

FIG. 12 is a diagram of an example format of the QoS parameter and load fields in the parameter measured subfield 1200. Within the parameters measured subfield 1201, the QoS related parameters may include but are not limited to QoS load field 1202 and QoS parameters field 1203.

The QoS load field 1202 may include load information for QoS traffic that may impact performance of neighboring STAs and networks such as BSS, PBSS, relay BSS, etc. The QoS load field 1202 may include a number of fields 1204 and field 1 subfield 1205-field N 1206 subfield. Each of the field 1 subfield 1205 through field N 1206 subfield may include type subfield 1207 and load subfield 1208. The type subfield 1207 may indicate the type of load and may have the following values: AC_SensorMeters (this may be the AC/traffic for sensor and meter devices), AC_FILS (this is the AC/traffic for Fast Initial Link Setup (FILS)), AC_BatteryDevice (this the AC for battery-powered devices which will require faster access to medium and less awake time to preserve battery), AC_VI and AC_VO (ACs for video and voice), AC Plus (AC or traffic for subscribers with Plus subscription level), AC Basic (AC or traffic for subscribers with Basic subscription level) or the like.

The load subfield 1208 may indicate the traffic load of the type indicated in the type field 1207. In case of AC_SensorMeters, the load for sensor/meter traffic may be specified by the (expected) number of STAs that are conducting medium access (e.g., in a given access window or RAW), max, min, average or standard deviation of medium occupation time needed to transmit all frames, which may include PS-Polls, ACKs, BAs, data, control and management frames and retransmissions. In case of AC_FILS, the load for FILS traffic may be specified by the (expected) number of STAs that may be conducting the FILS process. The FILS traffic may be in addition to the traffic that the STAs that are already associated with the AP/RAP/PCP are transmitting and receiving. In case of AC_BatteryDevice, the traffic load for battery-powered devices may be specified similarly as that for AC_SensorMeters. In case of AC_VI and AC_VO, the traffic load for AC_VI and AC_VO may be specified similarly as shown in FIG. 3.

The QoS parameters field 1203 may include the QoS parameter values that may impact performance of neighboring STAs and networks such as BSS, PBSS, relay BSS, etc. The QoS parameters field 1203 may include number of fields 1209 and field 1 1210 subfield through field N 1211 subfield. Each of the field 1 1210 through field N 1211 subfields may include AC subfield 1212 and parameter values subfield 1213. The AC 1212 subfield, in addition to the ACs that are currently defined, may have the following values: AC_SensorMeters, AC_FILS, AC_BatteryDevice, AC Plus, AC Basic, etc.

The parameter values subfield 1213 may specify parameters for each AC including but not limited to: CWmin, CWmax, AIFS, RIFS, max TXOP duration, and max/min service period. TXOP duration may be generally defined as described above.

In one embodiment, the QoS Load and QoS Parameters may be specified for the entire network/BSS and shared among a set of APs or STAs. In yet another embodiment, the QoS Load and QoS Parameters may be specified for one or more beacon subintervals, RAWs/PRAWs/TWTs/access windows, and/or for a specific channel or bandwidth, and/or for a particular set of STAs, such as a relay BSS, or a set of STAs identified by a group ID.

When there is a dense deployment of APs and BSSs in an area, resources may need to be shared among the OBSS. Methods to coordinate and optimize the resource usage among the OBSS may enable resource sharing. In particular, methods to coordinate and optimize frequency/bandwidth resources among the OBSS may be used. Methods may also be used to coordinate and optimize the usage and assignment of beacon intervals/sub-intervals as well as time slots such as RAW, PRAWs, TWTs, restricted windows for certain types of STAs (for example a window during which only HEW STAs are allowed to access, or a subinterval during which only IEEE 802.11n devices are allowed to access), among the OBSS.

Figure 13:
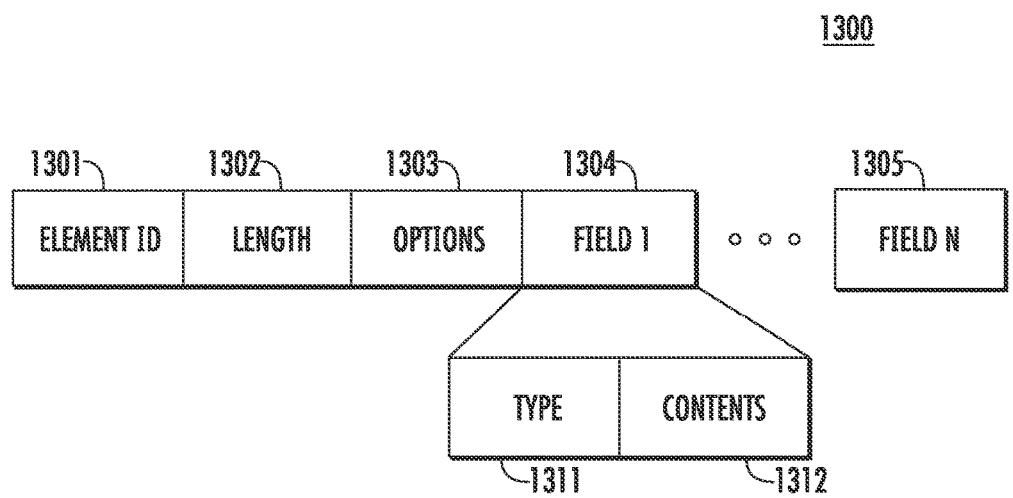
FIG. 13 is a diagram of an example format of a coordination request IE.

FIG. 13 is a diagram an example format of a coordination request IE 1300 that may be used by STAs in a network of networks to negotiate their coordination with STAs in the neighboring and/or overlapping networks. The STAs may negotiate network coordination using a frame containing the coordination request IE shown in FIG. 13. The coordination request IE may include but is not limited to the following fields: element ID field 1301, length field 1302, options field 1303, and field 1 1304 through field N 1305.

The element ID 1301 field may indicate that the current IE is a coordination request IE. The length field 1302 may contain the length of the coordination request IE. The options field 1303 may indicate various options for the coordination and may contain the following information: sequence number (the identification of the coordination request), number of fields contained in the coordination request, and types of parameters contained in the coordination request IE (e.g., primary channel, coordination channel, TXOP, TIM/UL access window, QoS settings, TXOP as generally defined above, etc.).

Each of fields 1 1304 through field N 1305 may contain one or more types of parameters that are subject to coordination and may include type subfield 1311 and contents subfield 1312. The type subfield 1311 may specify the type of parameters specified in the field, (for example, primary channel, coordination channel, TXOP/beacon subinterval/RAW/PRAW/TWT/access window, TIM/UL access window, TXOP as generally defined above, etc.). The contents subfield 1312 may specify the parameters indicated by the type subfield 1312.

The contents subfield 1312 may specify the primary channel that the transmitting STA is expecting to use for its network, such as a BSS, relay BSS, PBSS, etc. The primary channels may be indicated by one or more sets of (channel number, bandwidth). If more than one set of (channel number, bandwidth) is specified, then a schedule may be included to indicate that when the primary channel specified by (channel number, bandwidth) may be valid.

Primary channels and/or operational channels may be the same or different for networks that overlap. If the primary channel and/or operational channel is the same for more than one network, additional parameters such as ExpectedNumberMediumAccess (that may be the number of STAs, or the number of expected transmissions by all relevant STAs within a specified time period or unit of time) or ExpectedTrafficLoad (that may be indicated by max, min, mean or standard deviation of traffic load within a specified time period) may be included to ensure that all networks sharing the same primary channels/operational channels during the same period will have satisfactory performance.

If primary channels are dynamic (such as specified by a schedule), the AP/RAP/PCP may include the primary channel schedule in their beacon, short beacon frame or any other type of frame as well as include the schedule in probe response and association response frames.

The contents subfield 1312 may specify the coordination channel, which is the channel that the APs/RAPs/relay STAs/PCP in overlapping networks use for coordination purposes. The coordination channel may be indicated by one or more sets of (channel number, bandwidth). A schedule may be included to indicate when the coordination channel(s) specified by (channel number, bandwidth) may be valid.

The coordination channel may be identical for all networks that desire to conduct coordination with one or more neighboring networks. The term coordination channel is general and may be through the WLAN connection, or through other type of wireless/wirelined interface, such as WiMAX, LTE, Ethernet, etc. The coordination channel may be included in frames such as beacon, short beacon frames or any other type of frames.

The contents subfield 1312 may also indicate TXOP/beacon subinterval/RAW/PRAW/TWT/restricted window/access window. The TXOP/beacon subinterval/RAW/PRAW/TWT/restricted window/access window may be specified in different ways such as (starting time, duration). Alternatively, the TXOP/beacon subinterval/RAW/PRAW/TWT/restricted window/access window may be indicated by (starting time, duration, transmission sector). The transmission sector may be the sector of an AP when the AP transmits using directional antennas. It may also refer to a particular spatial channel used for beamforming. Alternatively, the TXOP/beacon subinterval/RAW/PRAW/TWT/restricted window/access window may be indicated by (starting time, duration, frequency channel). The frequency channel may be specified by a set of channel numbers, of which the channels may or may not be contiguous. It may also be specified by a channel number and a channel bandwidth. Alternatively, the TXOP/beacon subinterval/RAW/PRAW/TWT/restricted window/access window may be indicated by (starting time, duration, frequency channel, transmission sector). All the expressions above may be referred to as TXOP as generally defined above. For example, when a RAW is included, it may include information such as an indication of the RAW start time, the RAW duration, and a bitmap indicating allowed primary channels in order to provide contention reduction and coordination information to the STA.

The TXOP/beacon subinterval/RAW/PRAW/TWT/restricted window/access window and the associated parameters may be specified by (TXOP, AccessMethod, SharingPolicy, Allowed STAs, Allowed Traffic, QoS settings, NumberExpectedAccess, ExpectedLoad).

AccessMethod may include EDCA, HCCA or HEMM. SharingPolicy may be Shared or Exclusive. When SharingPolicy is set to Shared, it may indicate that the transmitting network may share the same TXOP with neighboring networks. When the SharingPolicy is set to Exclusive, it may indicate that the transmitting network requests exclusive TXOPs so that no other networks may be transmitting at that same time.

Allowed STAs may indicate the type of STAs that are allowed to use the TXOP/beacon subinterval/RAW/PRAW/TWT/restricted window/access window, such as sensors and meters, battery powered devices, IDs of the group stations, interference groups, HEW STAs, legacy STAs, etc. Allowed Traffic may indicate the allowed type of traffic that may use the medium access, such as AC_SensorMeter, AC_BatteryDevices, AC_VI, AC_VO, AC_BE, AC_BK, AC_FILS, AC Plus, and AC Basis. QoS settings may include settings for different AC categories.

NumberExpectedAccess may indicate the total number of medium access expected during the TXOP, which may refer to TXOP as generally defined above. NumberExpectedAccess may be the total number of STAs competing for medium access, or the total number of medium access required to transmit all frames which may or may not include retransmissions, ACKs, etc.

ExpectedLoad may indicate the expected total time needed to transmit the total traffic load and may be specified by max, min, average and standard deviation of the traffic transmission time. Alternatively or additionally, the expected load may also be indicated using the total aggregated data that needs to be transmitted, and additionally may be specified by max, min, average, and standard deviation of the traffic amount, e.g., in Mb.

The contents field 1312 may also indicate a TIM/UL access window. The TIM/UL access window is a special case of TXOP and may include the following information: TIM beacon/TIM short beacon time (the time to transmit the beacon or short beacon frames), start of UL access window, max number of positive TIM indication, UL/DL transmission slot duration, max duration of UL access window, etc.

When a STA receives a frame containing the coordination request IE as shown in FIG. 13, the STA may reply with a frame containing coordination response IE if it is also capable of coordination.

Figure 14:
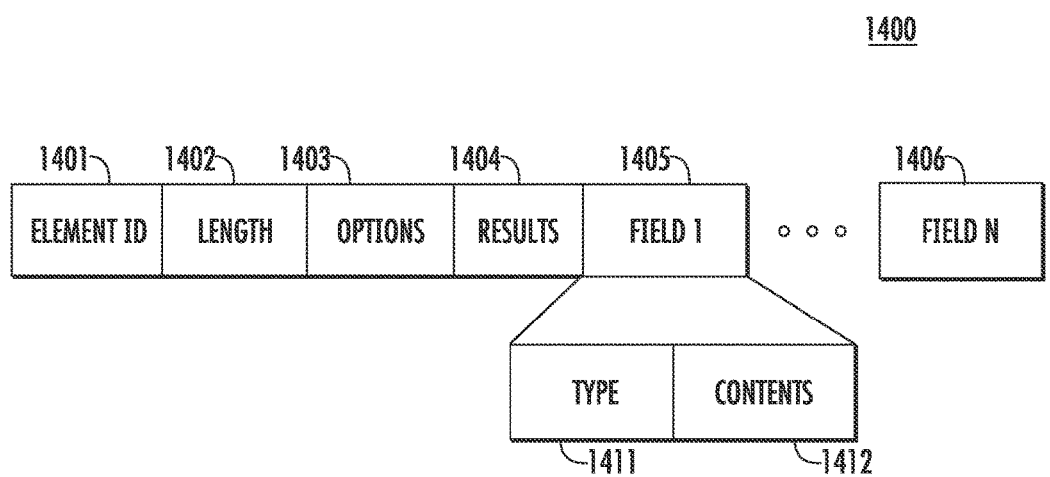
FIG. 14 is a diagram of an example format of the coordination response IE.

FIG. 14 is a diagram an example format of the coordination response IE 1400. The coordination response IE may include but is not limited to the following fields: element ID field 1401, length field 1402, options field 1403, results field 1404, and field 1 1405 through field N 1406. The format of the coordination response IE may largely follow that of the coordination request IE with the following exception: the results field 1404 may indicate the status of the coordination request and may have the following values: SUCCESS, REJECT, or alternative values. Alternative values as defined herein include new values different than those included in the request but may be acceptable to the responding STA or AP. The type subfield 1411 in field 1 1405 through field N 1406 may indicate that the contents subfield 1412 may contain alternative values for primary channel, coordination channel, TXOP, TIM/UL access window, TXOP as generally defined above, etc. that the transmitting STA proposes, which may be different than the original values indicated in the coordination request IE.

The coordination request/response IEs or any subset of the fields or subfields thereof may be implemented as a field or subfield or subsets of subfields of any conventional or new IE, or as a part of any control, management or other type of frames or in MAC/PLCP headers.

Figure 15:
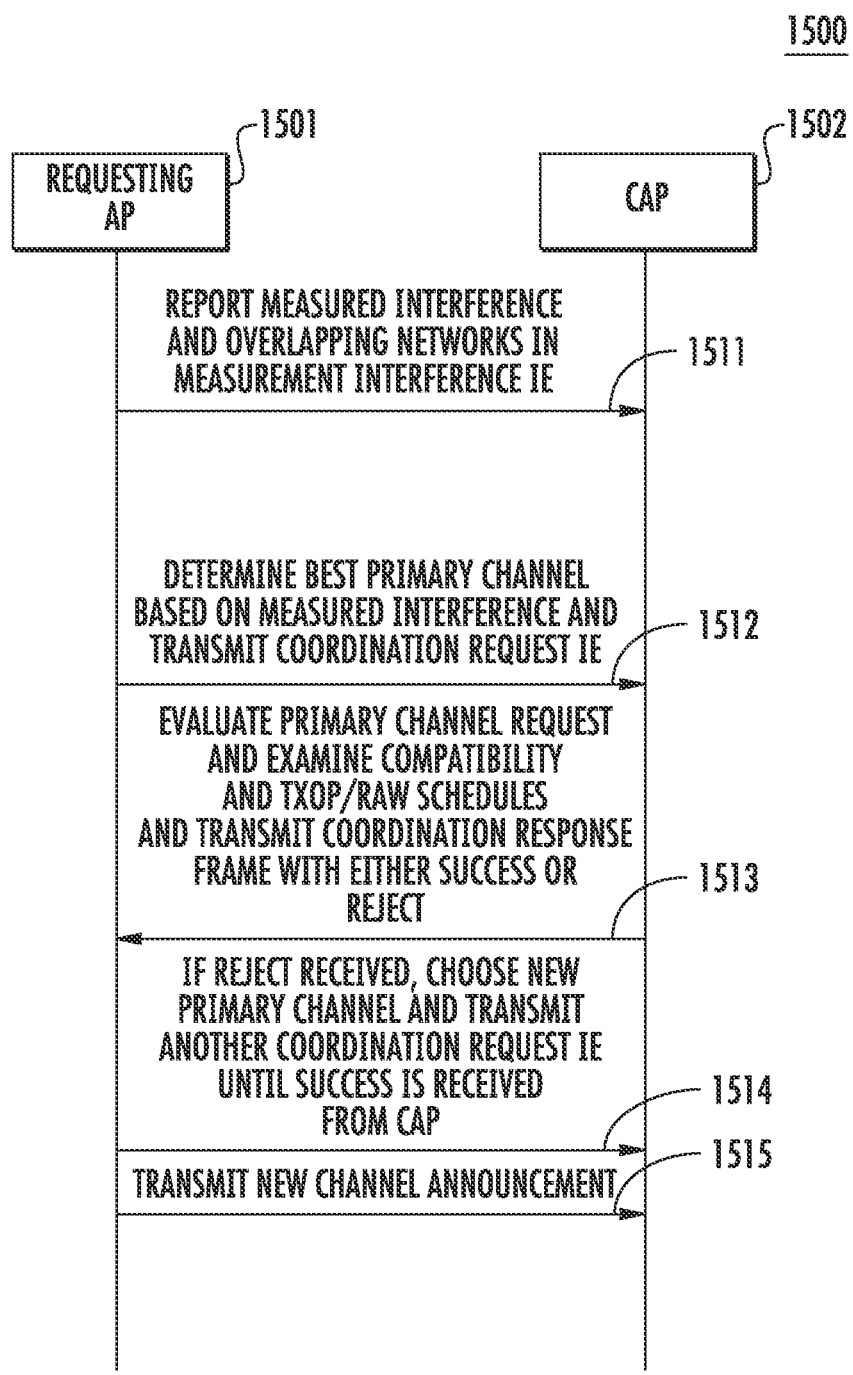
FIG. 15 is a signal flow diagram of an example primary channel coordination procedure.

FIG. 15 is a signal flow diagram of an example centralized primary channel coordination procedure 1500 performed by an AP. This procedure may also be performed by an RAP, relay STA, PCP, etc. In order to conduct channel coordination, the AP (or RAP, relay STA, PCP, etc.) may indicate in its beacon, short beacon or other type of frames that it is capable of channel coordination in accordance with any of the procedures described above. When STAs conduct interference measurements, they may collect overheard beacons or short beacons and report to their AP any overheard AP/networks that may be capable of channel coordination. Networks may conduct channel coordination with other networks that are capable of channel coordination. For a given AP and network, the set of neighboring networks that are overlapping and are capable of coordination is referred to as coordination candidates (CC) and the respective AP/RAP/PCP/relay STA are referred to as coordination candidate AP (CorAP).

Channel coordination may include distributed channel coordination or centralized channel coordination. In the case of centralized channel coordination, there may be at least one centralized coordination AP (CAP), and the primary channel coordination procedure detailed in FIG. 15 may be performed by a requesting AP 1501 and the CAP 1502. The procedure of FIG. 15 is an example and may be expanded to any number of APs. When an AP initiates a network, or when a network/AP plans to switch its primary channel, it may first scan the environment. Requesting AP 1501 may report measured interference as well as the networks that are overlapping with its own network using a message such as a measurement interference IE 1511 by transmitting the measurement interference message or IE to the CAP 1502. The measurement interference message or IE includes interference measured by the AP. The measured interference reported by the requesting AP may include any of the parameters detailed herein. This report may allow the CAP 1502 to maintain/update a list which networks are overlapping with other networks as well as the settings of all networks such as primary channels, reserved TXOP/RAW/PRAW/TWT/restricted window schedules, QoS settings, TIM/UL access windows, TXOP as generally defined above, schedules and parameters. This maintained list may be updated based on the received measured interference IE.

Requesting AP 1501 may determine the best primary channel for itself based on the measured interference and may transmit a coordination request IE 1512 to the CAP 1502. The coordination request IE may be transmitted either in a separate frame or in the same frame as the interference measurement IE in order to request to use a new primary channel.

CAP 1502 may then evaluate the primary channel request and examine whether the new primary channel request is compatible with all primary channels as well as TXOP schedules, RAWs, or TXOPs as generally defined above in the list of overlapping networks with the requesting networks and transmit a coordination request with either SUCCESS or REJECT 1513. If no conflict is detected, CAP 1502 may respond to the coordination request with a coordination response frame with the status SUCCESS. The requesting AP 1501 may then transmit a new channel announcement 1515 to CAP 1502 to announce switching to the new primary channel for its network.

If a conflict is detected, CAP 1502 may respond to the coordination request with a coordination frame with the status set to REJECT, which may also include alternative primary channel(s) that requesting AP 1501 may use as the new primary channel. REJECT may also include alternative values as defined herein. If REJECT is received, requesting AP 1501 may then choose a new primary channel and transmit another coordination request frame 1514 to CAP 1502 until CAP 1502 replies with a coordination response frame with the status SUCCESS or until requesting AP 1501 determines that it cannot find a suitable primary channel. If alternative values are included in the coordination response, the requesting AP may evaluate whether that alternative value is acceptable. If it is acceptable, the requesting AP may respond to the CAP that it accepts the alternative value. After receiving SUCCESS, requesting AP 1501 may then transmit a new channel announcement 1515 to the CAP 1502 to announce switching to the new primary channel for its network. Subsequently, the requesting AP may transmit or broadcast a new channel announcement in a beacon, short beacon or any other type of frames.

Figure 16:
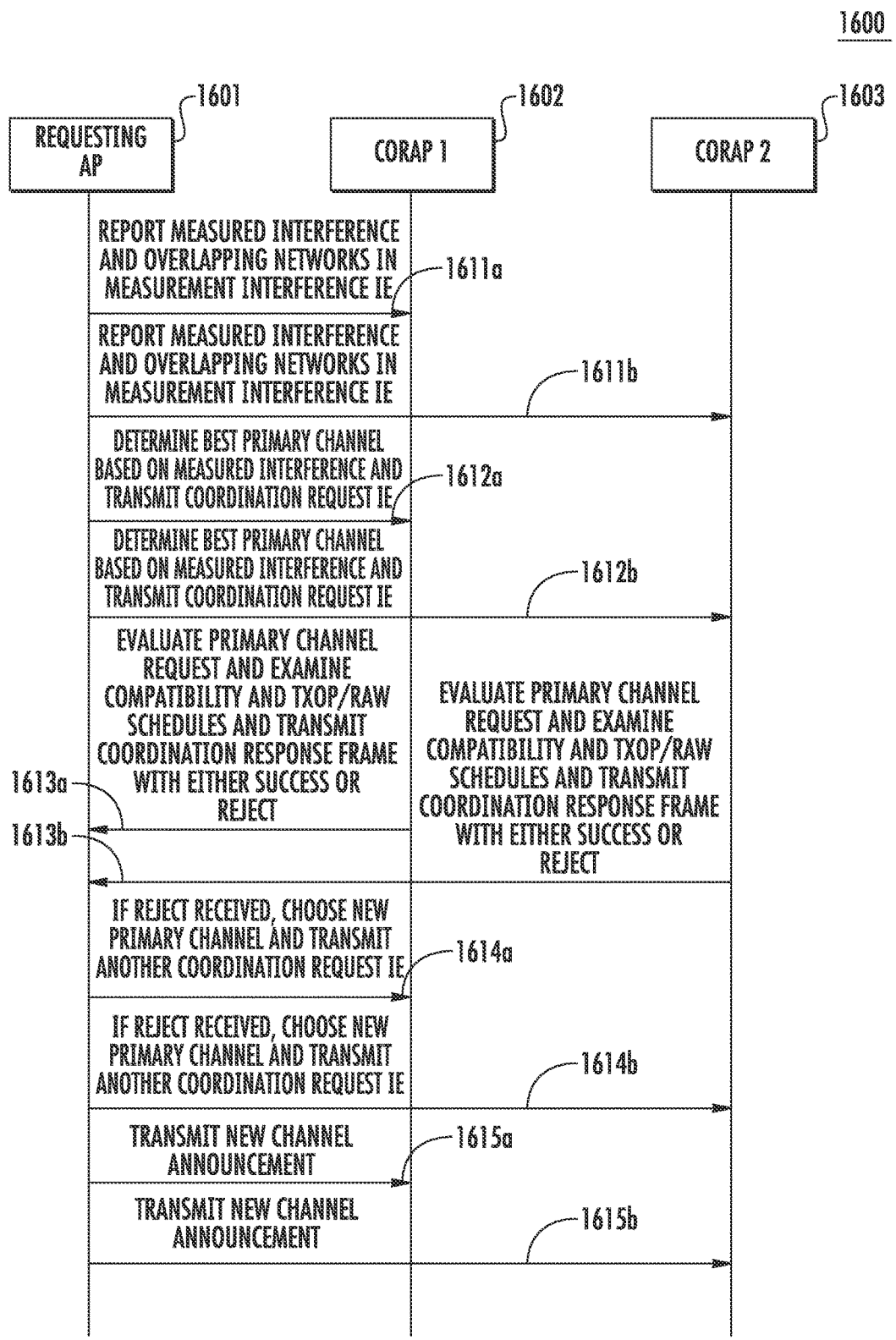
FIG. 16 is a signal flow diagram of an example distributed primary channel coordination procedure.

FIG. 16 is a signal flow diagram of an example distributed primary channel coordination procedure 1600, which may be performed by a plurality of APs. In the example of FIG. 16, there is one requesting AP 1601 and two CorAPs 1602 and 1603. However, this example may be expanded to any number of requesting APs and CorAPs or CCs. In distributed channel coordination, each AP may maintain/update a list of networks which are overlapping with its own network as well as the settings of all these networks such as primary channels, reserved TXOP schedules, QoS settings, TIM/UL access windows schedules, and parameters. TXOP in this procedure may be used as generally defined above. Requesting AP 1601 may report measured interference as well as the networks that are overlapping with its own network using a measurement interference IE 1611*a* by transmitting the measurement interference IE to CorAP 1602. Similarly requesting AP 1601 may report measured interference as well as the networks that are overlapping with its own network using a measurement interference IE 1611*b* by transmitting the measurement interference IE to CorAP 1603. The measured interference reported by the requesting AP may include any of the parameters detailed herein. Requesting AP 1601 may transmit measured interference reports periodically or when changes are detected.

Requesting AP 1601 may then determine the best primary channel for itself based on the measured interference and transmit the coordination request IEs 1612*a* and 1612*b* to CorAP 1602 and CorAP 1603 respectively. The coordination request IE may be in the same frame as the interference measurement IE, or in a separate frame to request to use a new primary channel to all CC or CorAPs.

CorAPs 1602 and 1603 may evaluate the primary channel request and examine whether the new primary channel request is compatible their own primary channels as well as TXOP schedules or RAWs and transmit a coordination response frame with SUCCESS or REJECT 1613*a* and 1613*b* respectively. If no conflict is detected, CorAP 1602 and CorAP 1603 may reply with a coordination response frame with the status SUCCESS.

If a conflict is detected, CorAP 1602 and CorAP 1603 may reply with a coordination response frame with the status set to REJECT which may also include an alternative primary channel(s) that requesting AP 1601 may use as the new primary channel. If reject is received, the requesting AP 1601 may then choose a new primary channel and transmit another coordination request IE 1614*a* and 1614*b* to CorAP 1602 and CorAP 1603 respectively until all CorAPs reply with a coordination response IE with the status SUCCESS or until the requesting AP 1601 determines that it cannot find a suitable primary channel. If an alternative primary channels are included in the coordination response, the requesting AP may evaluate the alternative values. If it is acceptable, the requesting AP may construct new coordination requests including the new primary channel values to all CorAPs.

Requesting AP 1601 may then transmit a new channel announcement 1615*a* and 1615*b* to CorAP 1602 and CorAP 1603 respectively to announce switching to the new primary channel for its network if it has received a coordination response frame with the status set to SUCCESS from all CorAPS, or if at least a set number of beacons has been received from all CCs or CorAPs since the transmission of coordination request frames to all CCs or CorAPs, or if at least a set period of time has elapsed after the coordination request frame has been sent to all CCs or CorAPs. Subsequently, the requesting AP may transmit or broadcast a new channel announcement in a beacon, short beacon or any other type of frame.

A collection of CC networks that are at least partially overlapped with each other may determine a common channel that may be available at least for some time interval periodically to conduct coordination, which is referred to herein as coordination channel coordination (CoorChannel). In centralized coordination channel coordination, the CAP may announce its own channel or channels and/or an availability schedule so that all APs in the CCs know when and on which channel these APs may contact the CAP for centralized coordination.

Figure 17:
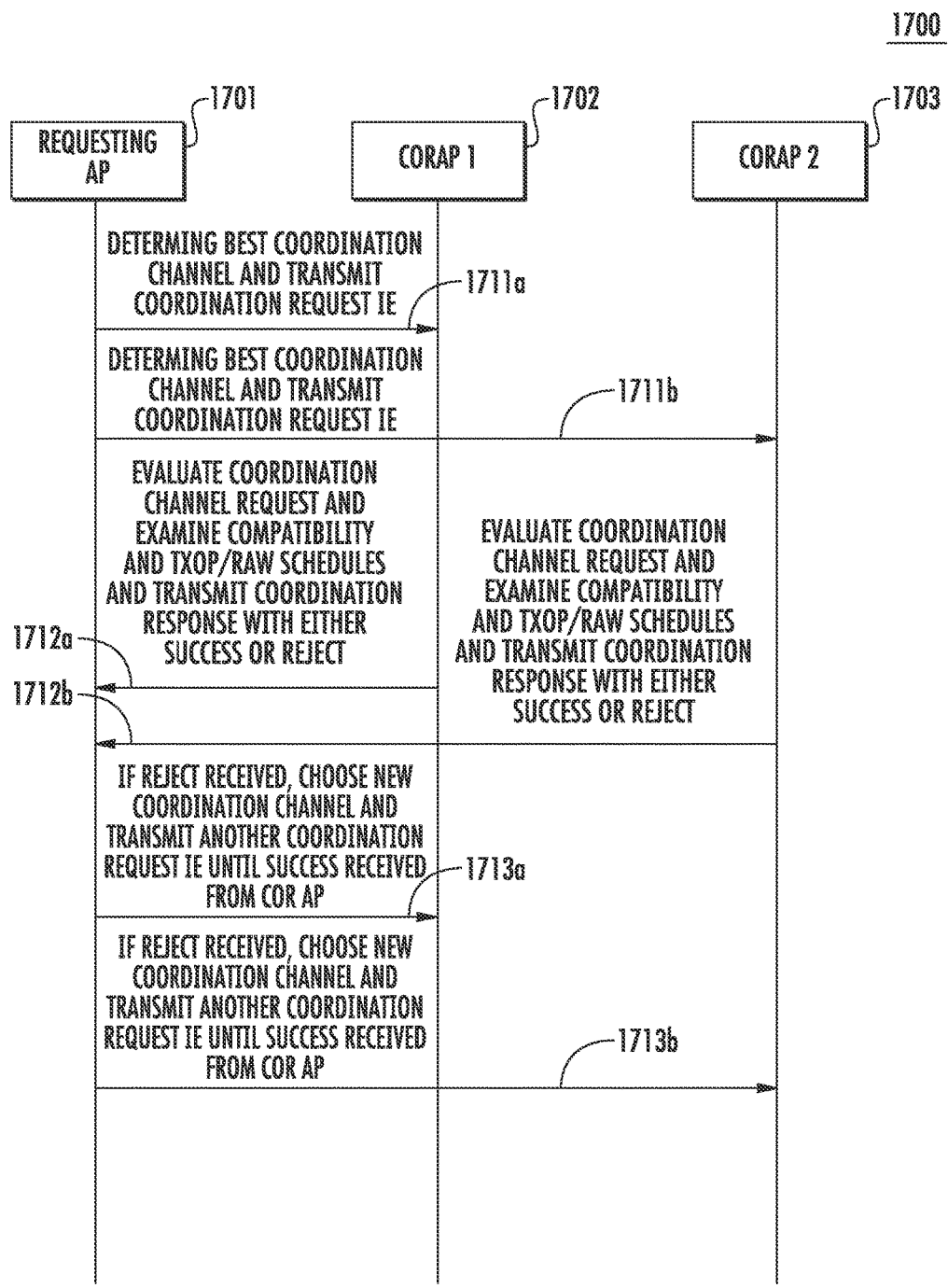
FIG. 17 is a signal flow diagram of an example distributed coordination channel coordination procedure.

Coordination channel coordination may also be distributed. FIG. 17 is a signal diagram of an example procedure for distributed coordination, channel coordination 1700. In the example of FIG. 17, there is one requesting AP 1701 and two CorAPs 1702 and 1703. However, this example may be expanded to any number of requesting APs and CorAPs or CCs. In distributed coordination, channel coordination, each AP may maintain/update a list of networks which are overlapping with its own network as well as the settings for all of these networks such as primary channels, coordination channels, reserved TXOP schedules, QoS settings, TIM/UL access windows schedules, and parameters. TXOP in this procedure may be used as generally defined above. Requesting AP 1701 may determine a best coordination channel based on the measured interference and transmit a coordination request in a coordination request IE 1711*a* to CorAP 1702. Similarly, requesting AP 1701 may determine a best coordination channel based on the measured interference and transmit a coordination request in a coordination request IE 1711*b* to CorAP 1703. The coordination request IE may be in the same frame as the interference measurement IE, or in a separate frame to all CCs or CorAPs to request to use a different coordination channel or a set of new coordination channels with a schedule when the coordination channel(s) may be valid.

CorAP 1702 and CorAP 1703 may evaluate the coordination channel request and examine whether the new coordination channel request is compatible with its own primary channel as well as TXOP/RAW schedules and transmit a coordination response with either SUCCESS or REJECT 1712*a* and 1712*b* respectively. If no conflict is detected, CorAP 1702 and CorAP 1703 may transmit a coordination response frame with the status SUCCESS. If a conflict is detected, CorAP 1702 and CorAP 1703 may transmit a coordination response frame with the status set to REJECT which may also include alternative coordination channel(s) that the requesting AP may use as the new coordination channel. If REJECT is received, requesting AP 1701 may then choose a new coordination channel (or evaluate the alternative channels included in the coordination response) and transmit another coordination request IE 1713*a* and 1713*b* to CorAP 1702 and CorAP 1703 respectively until all CorAPs reply with a coordination response frame with the status SUCCESS or until requesting AP 1701 determines that it cannot find a suitable new coordination channel.

Figure 18:
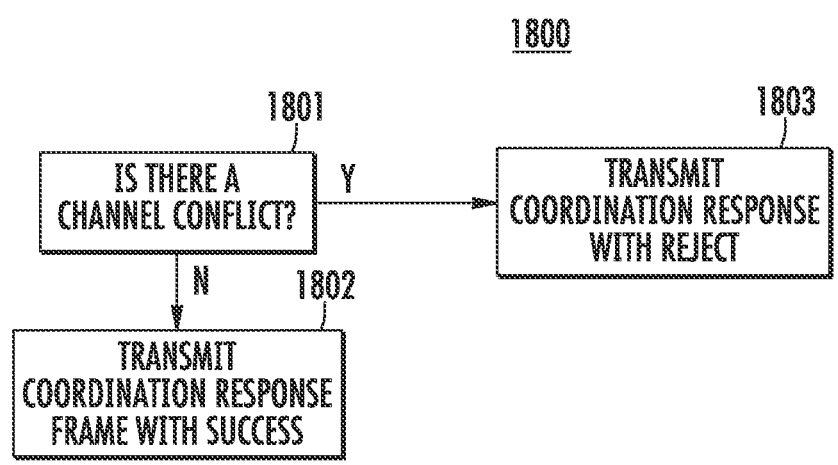
FIG. 18 is a diagram of an example of how each CorAP may evaluate the coordination channel request and examine whether the new channel request is compatible with its own primary channel as well as transmission opportunities (TXOP)/restricted access window (RAW) schedules.

FIG. 18 is a diagram of an example of how each CorAP may evaluate a coordination channel or primary channel request 1800 and examine whether the request is compatible with its own primary channel as well as TXOP/RAW schedules, as described in the procedures above. TXOP in this procedure may be used as generally defined above. First, a CorAP may determine if there is a conflict 1801. If no conflict is detected, the CorAP may transmit a coordination response frame with the status SUCCESS 1802. If a conflict is detected, the CorAP may transmit a coordination response frame with the status REJECT 1803, which may also include alternative coordination channel values that are acceptable for the responding AP or STA.

There are many operating bandwidths in the 802.11 networks. For example, 802.11ac devices may operate on 20 MHz, 40 MHz, 80 MHz, 160 MHz and 80+80 MHz bandwidth. 802.11ah devices may operate on 1 MHz, 2 MHz, 4 MHz, 8 MHz, and 16 MHz bandwidth. In order to prevent asymmetrical links which may lead to errors in carrier sense multiple access (CSMA), devices operating on different radio ranges may select or be assigned to operate on different channels. For example, there may be a set of channels specially reserved for 802.11ah devices and networks. The set of channels reserved for 1 MHz operations may be located anywhere in the available spectrum and may be contiguous or non-contiguous. Channels or sets of channels may be assigned in such a way that the remaining bandwidth may accommodate STAs of large operating bandwidth. Given that there are a limited number of channels, the channel assignment steps may assign channels based on efficiency.

For example, if there are 26 MHz of bandwidth available for 802.11ah devices, say Channel 0 to Channel 25, each of 1 MHz. Channel 0 and 1 may be reserved for 1 MHz operations, and Channel 2-25 may be used to accommodate at least one 16 MHz operating bandwidth for a set of networks and at least one more 8 MHz operation bandwidth for another set of networks. The 16 MHz and 8 MHz bandwidth may be shared by multiple 2 MHz, 4 MHz, 8 MHz and 16 MHz networks. Similarly, Channel 24 and 25 may be reserved for 1 MHz operations.

In another example, Channel 0 and 1, Channel 18 and 19 and 24, 25 may be reserved for 1 MHz operations. Channel 2-17 may offer a contiguous 16 MHz bandwidth while Channel 20-23 may offer a contiguous 4 MHz bandwidth.

Such procedures may apply to networks that have a longer radio range due to transmit power control as well.

Figure 19:
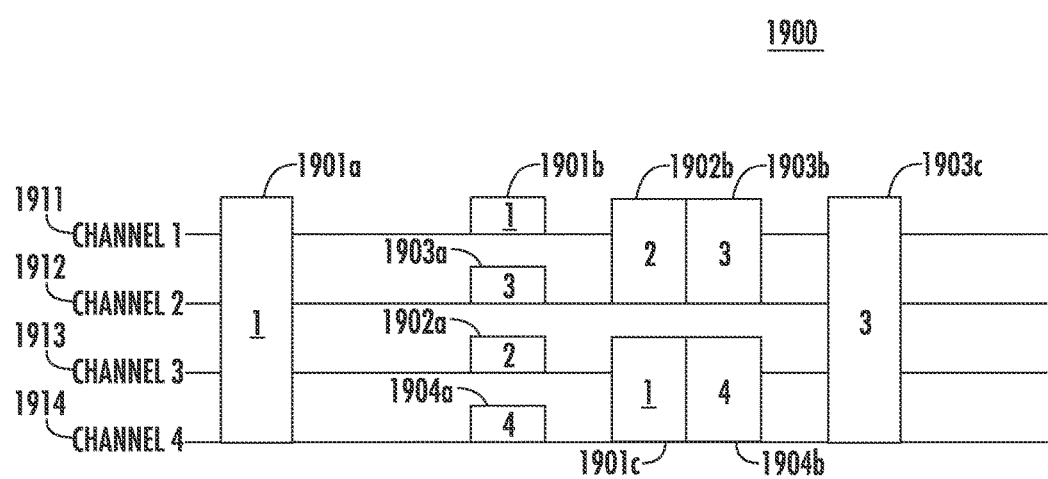
FIG. 19 is a diagram of reserved TXOPs in an example overlapping network of networks.

NNs may coordinate their reserved TXOPs/RAWs/PRAWs/TWTs/restricted windows/access windows, or TXOP as generally defined above. FIG. 1900 is a diagram of reserved TXOPs in an example overlapping network of networks 1900. In the example of FIG. 19, network 1 may reserve TXOPs 1901a on channel 1 1911, channel 2 1912, channel 3 1913, and channel 4 1914. In another example, network 1 may reserve TXOP 1901b on channel 1 1911, network 3 may reserve TXOP 1903a on channel 2 1912, network 2 may reserve TXOP 1902a on channel 3 1913, and network 4 may reserve TXOP 1904a on channel 4 1914. In yet another example network 2 may reserve TXOP 1902b on channel 1 1911 and channel 2 1912 while network 1 reserves TXOP 1901c on channel 3 1913 and channel 4 1914. In yet another example network 3 may reserve TXOP 1903b on channel 1 1911 and channel 2 1912 while network 4 reserves TXOP 1904b on channel 3 1913 and channel 4 1914. In yet another example network 3 may reserve TXOP 1903c on channel 1 1911, channel 2 1912, channel 3 1913, and channel 4 1914.

FIG. 19 is for illustration purposes only, and the number of channels shown is for example and there may be more or less channels in a network of networks. In addition, the bandwidth of each channel may be the same or different and the channels may be contiguous, non-contiguous, or located on the same or different frequency band(s).

Figure 20:
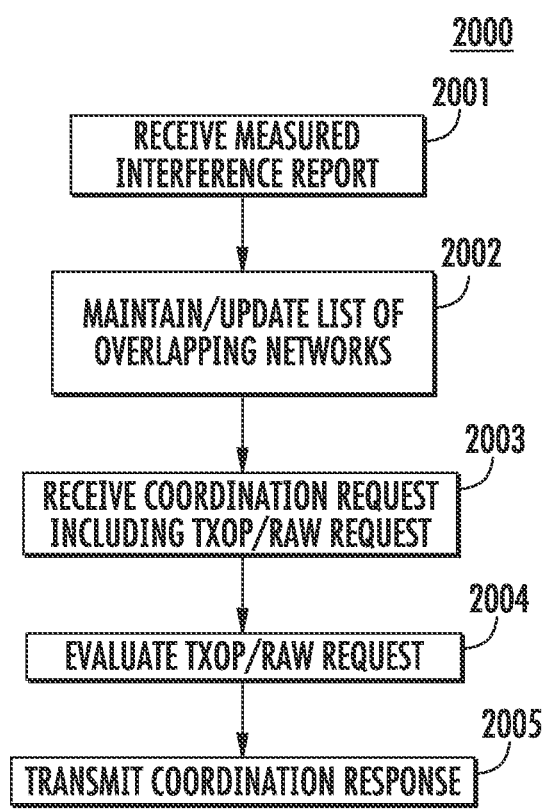
FIG. 20 is a diagram of a flow chart of an example procedure for TXOP/RAW coordination.

FIG. 20 is a flow chart of an example procedure for TXOP/RAW coordination 2000. In the example of FIG. 20, the procedure is performed by a CAP. In centralized coordination, there may be at least one CAP. The requesting AP may first report the measured interference as well as the networks that are overlapping with its own network to the CAP using measurement interference IE, and the CAP may receive the measured interference report 2001. The CAP may maintain/update a list of overlapping networks 2002, which may identify networks that are overlapping with other networks as well as the settings of all networks such as primary channels, reserved TXOP schedules, QoS settings, TIM/UL access windows schedules, and parameters. TXOP in the example procedure of FIG. 20 may be used as generally defined above.

Before the requesting AP may add a new beacon subinterval/RAW/TXOP assignment, it may first determine a best TXOP/RAW for itself based on the measured interference. The CAP may then receive the coordination request including the TXOP/RAW request 2003 transmitted from the requesting AP. The requesting AP may then send a coordination request IE in the same frame as the interference measurement IE, or in a separate frame to request a new TXOP/RAW assignment with the one or more parameters in (TXOP, AccessMethod, SharingPolicy, Allowed STAs, Allowed Traffic, QoS settings, NumberExpectedAccess, ExpectedLoad).

The CAP may evaluate the TXOP/RAW request 2004 and examine whether the request is compatible with existing TXOP schedules in the list of overlapping networks with the requesting networks.

If the SharingPolicy is set to Exclusive, the CAP may evaluate whether there are other TXOP/RAW schedules in the networks that overlap with the requesting network. TXOP/RAW schedules in the networks that overlap with the requesting network or on a different bandwidth or transmission sector may not be considered as conflicting with the TXOP/RAW schedule being requested.

If the SharingPolicy is set to Shared, the CAP may evaluate whether the total traffic load in the new and existing TXOP/RAWs in overlapping CCs may be accommodated without degrading the QoS performance to an unacceptable level. If the traffic load is too high for the TXOP requested, the CAP may provide an alternative schedule/bandwidth/transmission sector to the requesting network/AP, or propose to reduce any or all of the values of ExpectedLoad and/or NumberExpectedAccess. Alternatively, the CAP may propose to change Allowed STAs if there are interference groups of STAs in the requesting networks that are known not to be conflicting to use the requested TXOP, (for example, when STAs in one particular interference group in the requesting network do not overlap with the networks that currently hold reservation of the same TXOP).

The CAP may then transmit a coordination response 2005. If the TXOP is considered compatible, the CAP may respond with a coordination response frame with the status SUCCESS. The requesting AP may then announce assignment of a new TXOP or RAW including one or more information in (TXOP, AccessMethod, SharingPolicy, Allowed STAs, Allowed Traffic, QoS settings, NumberExpectedAccess, ExpectedLoad) to its STAs in its beacon, short beacon, or any other type of frames.

If incompatibility is detected, the CAP may reply with a Coordination Response frame with the status set to REJECT which may also include alternative TXOP proposals that the requesting AP may use. The requesting AP may then choose a new or modified TXOP and transmit another coordination request frame to the CAP until the CAP replies with a coordination response frame with the status SUCCESS or until the requesting AP determines that it may not find a suitable TXOP.

The example of FIG. 20 may also apply to distributed coordination. In distributed coordination, the TXOP coordination procedure may be as follows. Each AP may maintain/update a list of networks which are overlapping with its own network as well as the settings of all these networks such as primary channels, reserved TXOP schedules, QoS settings, TIM/UL access windows schedules and parameters. The requesting AP may first report the measured interference as well as the networks that are overlapping with its own network to all CorAPs using the measurement interference IE. Before the requesting AP adds a new beacon interval/RAW/TXOP assignment, the requesting AP may first determine a best TXOP/RAW for itself based on the measured interference. The requesting AP may send a coordination request IE in the same frame as the interference measurement IE, or in a separate frame to request a new TXOP/RAW assignment with one or more parameters in (TXOP, AccessMethod, SharingPolicy, Allowed STAs, Allowed Traffic, QoS settings, NumberExpectedAccess, ExpectedLoad) to all CorAPs.

Each CorAP may evaluate the TXOP/RAW request and examine whether this request is compatible with its own existing/proposed TXOP schedules.

If the SharingPolicy is set to Exclusive, the CorAP may evaluate whether there are other TXOP/RAW schedules in its own network that overlap with the requesting network. TXOP/RAW schedules that overlap with the requesting network, on a different bandwidth or transmission sector, may not be considered as conflicting with the TXOP/RAW schedule being requested.

If the SharingPolicy is set to Shared, the CorAP may evaluate whether the total traffic load in the new and existing TXOP/RAWs in its own network that overlap with the requesting network may be accommodated without degrading the QoS performance to an unacceptable level. If the traffic load is too high for the TXOP requested, the CorAP may provide an alternative schedule/bandwidth/transmission sector to the requesting network/AP. Alternatively, the CAP may propose to reduce any or all of the values of ExpectedLoad and/or NumberExpectedAccess, or propose to change Allowed STAs to a different group of STAs if there are interference groups of STAs in the requesting networks that are known not to be conflicting to use the requested TXOP/RAW, (for example, when STAs in one particular interference group in the requesting network do not overlap with the networks that currently hold reservation of the same TXOP/RAW).

If incompatibility is detected, the CorAP may reply with a coordination response frame with the status set to REJECT which may also include alternative TXOP/RAW proposals that the requesting AP may use. The requesting AP may then choose a new or modified TXOP/RAW and transmit another coordination request frame to all CorAPs until the TXOP/RAW is accepted or until the requesting AP determines that it cannot find a suitable TXOP/RAW.

If the requested TXOP/RAW is found to be compatible, the CorAP may reply with a coordination response frame with the status SUCCESS.

If the requesting AP has received a coordination response frame with the status set to SUCCESS from all CCs, or if at least a set number of beacons has been received from all CCs or CorAPs since the transmission of coordination request frames to all CCs or CorAPs, or if at least a set period of time has elapsed after the coordination request frame has been sent to all CCs or CorAPs, then the requesting AP may announce assignment of a new TXOP, RAW including information such as TXOP, AccessMethod, SharingPolicy, Allowed STAs, Allowed Traffic, QoS settings, NumberExpectedAccess, ExpectedLoad to its STAs in its beacon, short beacon, or any other type of frame.

When there is a dense deployment of APs and BSSs in an area, the APs may include traffic indication map (TIM) indications to their STAs in their beacons and short beacons. Efficient methods may be used for APs to coordinate the number of TIM indications per beacon interval and the uplink access window to ensure that the STAs with a positive TIM indication may retrieve the buffered DL traffic.

The TIM and UL access window coordination procedures largely follow those of TXOP/RAW/access window coordination procedures described above with the following exceptions. Each AP may maintain/update a list of networks which are overlapping with its own network as well as the settings of all these networks such as primary channels, reserved TXOP schedules, QoS settings, TIM/UL access windows schedules and parameters, beacon time, etc. Each CorAP may coordinate with each other their TIM beacon and TIM short beacon time so that there would be sufficient spacing between the TIM beacons and TIM short beacons in overlapping networks to allow sufficient time for UL access by the STAs in the overlapping networks for which there is a positive TIM indication in the respective TIM beacons and/or TIM short beacons.

If the SharingPolicy for UL access window is set to Shared, the CAP (in centralized coordination procedures)/CorAP (in distributed coordination procedures) may evaluate whether the total traffic load in the new and existing TXOP/RAWs/UL access window in overlapping CCs may be accommodated without degrading the QoS performance to an unacceptable level. If the traffic load is too high for the UL access window requested, the CAP/CorAP may provide an alternative schedule/bandwidth/transmission sector to the requesting network/AP, and the TIM beacon and TIM short beacon time/bandwidth/transmission sector, or propose to reduce any or all of the values of max number of positive TIM indication, UL/DL slot duration, max duration of UL access window, or propose to change Allowed STAs if there are interference groups of STAs in the requesting networks that are known not to be conflicting to use the requested TXOP, (for example, when STAs in one particular Interference Group in the requesting network do not overlap with the networks that currently hold reservation of the same access window).

FIGS. 21A-D are flow charts of example procedures in which STAs may receive channel or sector assignments and transmit channel or sector preferences in accordance with a fourth embodiment 2100, which may be used in combination with any of the embodiments described herein. A STA may be capable of multiple channel operating modes. In addition, a STA may experience different channel or sector conditions for different channels or sectors available in a BSS. Efficient methods for STAs to provide channel or sector preference indications on one or more or all available channels in the BSS and for the AP to provide channel assignment to the STA are disclosed.

A TXOP, RAW, PRAW, TWT, restricted window, beacon subinterval, access window, or TXOP as generally defined above may be specified by various forms including (starting time, duration), (starting time, duration, transmission sector), (starting time, duration, frequency channel), (starting time, duration, frequency channel, transmission sector), or the like. In addition, the primary channel of a BSS may be specified by one or more sets of (channel number, bandwidth), and a schedule to indicate that when the primary channel specified by (channel number, bandwidth) may be valid if more than one set of (channel number, bandwidth) is specified. Detailed procedures for channel preference indications and channel assignments are described hereafter.

In one example, STAs may be grouped based on their operation channel capability and/or based on the channel conditions. Without loss of generality, W may be used to indicate the bandwidth of the unit channel in a particular 802.11 air interface. For 802.11ah STAs, W may be 1 MHz, for 802.11ac STAs, W may be 20 MHz, and for 802.11af STAs, W may be 5 or 6 MHz.

STAs may be capable of operating in different modes, mode 1-N. Each mode may be associated with a different bandwidth, such as nW, where n is an integer. For 802.11ah, n may be 1, 2, 4, 8, 16, etc. For 802.11ac, n may be 1, 2, 4, 8. Each mode may be associated with different channel contiguity, i.e., whether the nW bandwidth may be contiguous or non-contiguous. Each mode may be associated with directional transmissions. Each mode may be associated with a combination of bandwidth, directionality, contiguity, and the like.

Furthermore STA may be capable of sectorized operation. When used herein, a sectorized operation refers to when a STA and/or AP transmit and receive within a sector, which is an angular portion of the coverage of the AP to which a STA may associate. Sectors are based on area.

STAs may report their own channel or sector operation modes that they are capable of, as well as their channel preferences to the AP during the association process, after the association process, or at any other time using a channel or sector preferences report IE, which may include a channel preferences report or sector preferences report, and may use the example procedure detailed in FIGS. 21A-D.

Figure 21A:
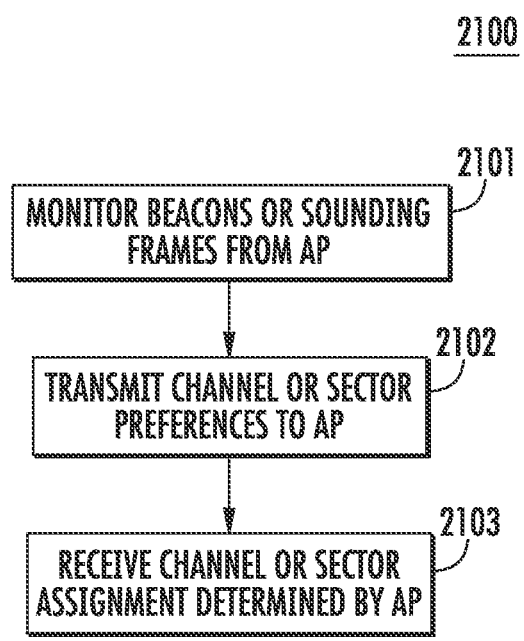
FIG. 21A is a diagram of a flow chart of an example procedure in which STAs may transmit channel or sector preferences and receive channel or sector assignments.

FIG. 21A is a flow chart of an example channel or sector assignment and preference transmission procedure. The example of FIG. 21A may be performed while associated with an AP, after disassociating with an AP, following reassociation with an AP, or when a STA is not associated with any AP. The example procedure of FIG. 21A may be performed by the STA multiple times or in multiple rounds as well. In this example, a STA may monitor beacons or sounding frames from an AP 2101 on one or more or all channels or sectors on which it may operate. The STA may transmit channel or sector preferences to the AP 2102 using a channel or sector preferences report IE in frames such as probe request, (re)association request, action or action without ACK frames, or in any management, control, or other type of frame. Using the channel or sector preferences report IE, the STA may provide the AP its capability of channel operating modes, as well as its preferred channels. The preferred channels may be determined to be of sufficient quality based on the measurements by the STA of sounding frames, beacon, or other types of frames from the AP.

Once the AP receives from a STA a channel or sector preferences report IE, the AP may evaluate whether the STA may be supported. If the STA cannot be supported, the AP may choose not to transmit a probe response, or decline (re)association, or to transmit a disassociation frame to the STA. If the STA may be supported, the AP may then assign a group and/or subgroup to the STA based on its channel mode capabilities, as well as its channel preferences indication. The AP may then transmit the assignment of the group, subgroup, channel assignment, schedules and parameters, etc. to the STA, using the channel or sector assignment IE, which may be included in probe response frame, beacon frame, short beacon frame, (re)association response frame, action frame, action without ACK frame, or any management, control, or other type of frames. The assigned channel may be an assigned primary or coordination channel. The STA may receive the channel or sector assignment determined by the AP 2103 in the channel or sector assignment IE.

Figure 21B:
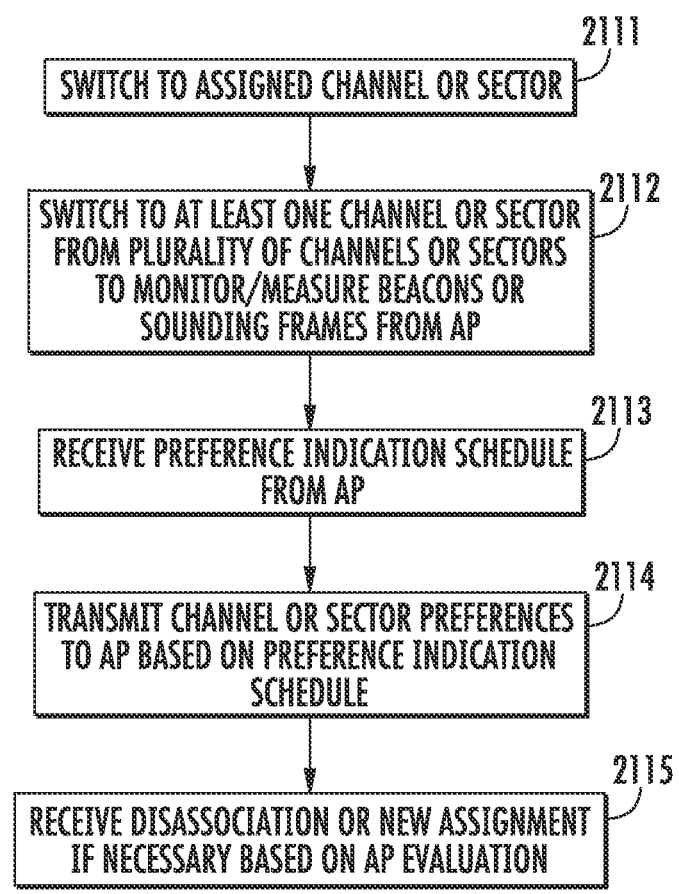
FIG. 21B is a diagram of a flow chart of an example procedure in which STAs may transmit channel or sector preferences and receive channel or sector assignments based on a preference indication schedule.

FIG. 21B is a flow chart of an example channel or sector assignment and preference transmission procedure based on a preference indication schedule. The example of FIG. 21B may be performed while associated with an AP, after disassociating with an AP, following reassociation with an AP, or when a STA is not associated with any AP. The example procedure of FIG. 21B may be performed by the STA multiple times or in multiple rounds as well. In this example, the STA may have received the channel or sector assignment determined by the AP and switch to the assigned channels or sectors 2111 and wake up according to the assignments and schedules received from the AP to conduct its normal operations.

The STA may switch to at least one channel or sector from a plurality of channels or sectors to monitor and measure beacons or sounding frames received from the AP 2112 periodically or according to the sounding schedules received from the AP.

The STA may receive a preference indication schedule from the AP 2113. The STA may then transmit channel or sector preferences to the AP based on the preference indication schedule 2114 using the channel or sector preferences report IE in any action, action without ACK, or any type of management, control, or other type of frames, periodically. Alternatively, the STA may transmit channel or sector preferences to the AP using any type of management, control, or other type of frame. The STA may also transmit channel or sector preferences to the AP periodically.

Finally, the AP may evaluate whether the STA may still be supported. If the STA is not supported, the AP may transmit a disassociation frame. If the STA may still be supported, the AP may evaluate whether a new assignment is necessary. If a new assignment is necessary, the AP may provide the new assignment using the channel assignment IE in any action, action without ACK, beacon, or any type of management, control, or other type of frame. As a result, the STA may receive a disassociation frame or a new assignment, if necessary, based on the AP evaluation 2115 or remain connected on the assigned channel or sector.

Figure 21C:
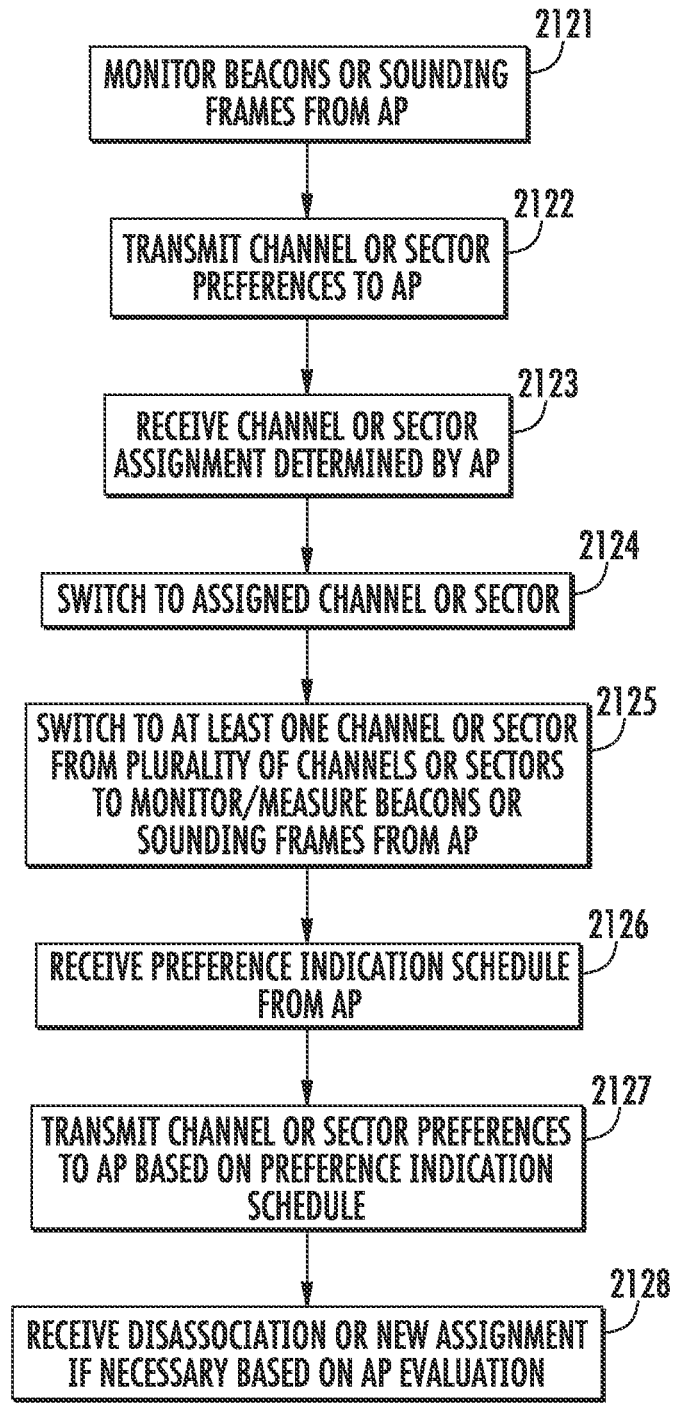
FIG. 21C is a diagram of a flow chart of an example combined procedure in which STAs may transmit channel or sector preferences and receive channel or sector assignments.

FIG. 21C is a flow chart of an example combined channel or sector assignment and preference transmission procedure. The example of FIG. 21C may be performed while associated with an AP, after disassociating with an AP, following reassociation with an AP, or when a STA is not associated with any AP. The example procedure of FIG. 21C may be performed by the STA multiple times or in multiple rounds as well. In this example, a STA may monitor beacons or sounding frames from an AP 2121 on one or more or all channels or sectors on which it may operate. The STA may transmit channel or sector preferences to the AP 2122 using a channel or sector preferences report IE in frames such as probe request, (re)association request, action or action without ACK frames, or in any management, control or other type of frame. Using the channel or sector preferences report IE, the STA may provide the AP its capability of channel operating modes, as well as its preferred channels. The preferred channels may be determined to be of sufficient quality based on the measurements by the STA of sounding frames, beacon or other types of frames from the AP.

Once the AP receives from a STA a channel or sector preferences report IE, the AP may evaluate whether the STA may be supported. If the STA cannot be supported, the AP may choose not to send a probe response, or decline (re) association, or to transmit a disassociation frame to the STA. If the STA may be supported, the AP may then assign a group and/or subgroup to the STA based on its channel mode capabilities, as well as its channel preferences indication. The AP may then transmit the assignment of the group, subgroup, channel assignment, schedules and parameters, etc. to the STA, using the channel or sector assignment IE, which may be included in probe response frame, beacon frame, short beacon frame, (re)association response frame, action frame, action without ACK frame, or any management, control, or other type of frame.

The STA may receive the channel or sector assignment determined by the AP 2123 and switch to the assigned channels or sectors 2124 and wake up according to the assignments and schedules received from the AP to conduct its normal operations.

The STA may switch to at least one channel or sector from a plurality of channels or sectors to monitor and measure beacons or sounding frames received from the AP 2125 periodically or according to the sounding schedules received from the AP.

The STA may receive a preference indication schedule from the AP 2126. The STA may then transmit channel or sector preferences to the AP based on the preference indication schedule 2127 using the channel or sector preferences report IE in any action, action without ACK, or any type of management, control, or other type of frame, periodically.

Alternatively, the STA may transmit channel or sector preferences to the AP using any type of management, control, or other type of frames. The STA may also transmit channel or sector preferences to the AP periodically.

Finally, the AP may evaluate whether the STA may still be supported. If not, the AP may transmit a disassociation frame. If the STA may still be supported, the AP may evaluate whether a new assignment is necessary. If a new assignment is necessary, the AP may provide the new assignment using the channel assignment IE in any action, action without ACK, beacon, or any type of management, control, or other type of frames. As a result, the STA may receive a disassociation frame or a new assignment, if necessary, based on the AP evaluation 2128 or remain connected on the assigned channel or sector.

Figure 21D:
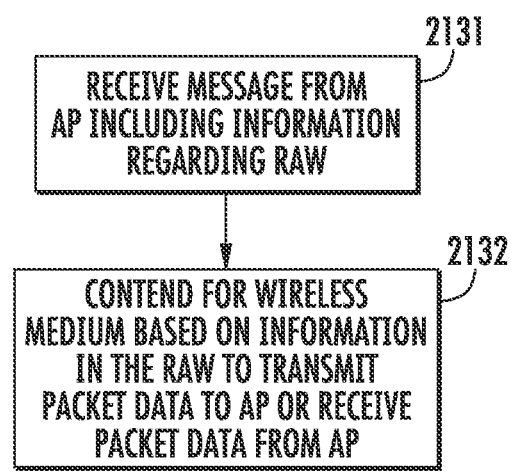
FIG. 21D is a flow chart of an example procedure in which STAs may receive information that may be used for contention reduction and coordination with STAs in the neighboring and overlapping networks.

FIG. 21D is a flow chart of an example procedure in which STAs may receive information from an AP for use in contention and interference reduction and coordination with other STAs in the neighboring and overlapping networks. The example of FIG. 21D may be performed while associated with an AP, after disassociating with an AP, following reassociation with an AP, or when a STA is not associated with any AP and may be used in combination with any of the embodiments described herein. The example procedure of FIG. 21D may be performed by the STA multiple times or in multiple rounds as well. The procedure of FIG. 21D may also be performed following performance of the channel or sector assignment and preference transmission procedure detailed above.

In this example, a STA may receive a message from an AP including information regarding a RAW 2131 wherein the RAW is to be used for channel or sector preference indication reporting. The information regarding the RAW may include but is not limited to an indication of RAW start time, the RAW duration, and/or a bitmap indicating allowed channels. The allowed channels may be primary channels, coordination channels, or operating channels. The STA may then contend for the wireless medium based on the information in the RAW to transmit packet data to the AP and to receive packet data from the AP 2132. The RAW in the example of FIG. 21D may also refer to a TXOP as generally defined above.

Figure 22:
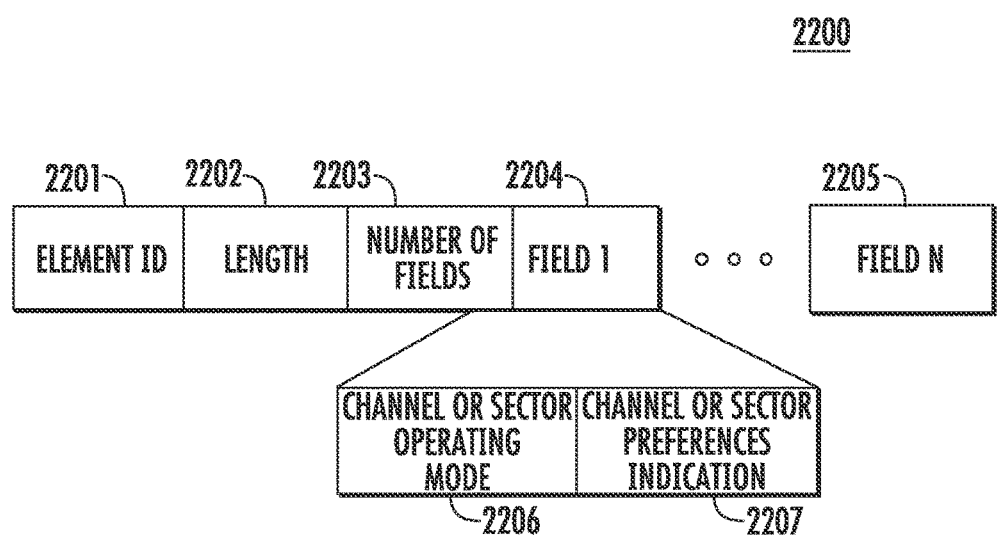
FIG. 22 is a diagram of an example format of the channel or sector preferences report IE.

FIG. 22 is a diagram an example format of the channel or sector preferences report IE 2200. The channel or sector preferences report IE may include but is not limited to the following fields: element ID filed 2201, length field 2202, number of fields field 2203, and field 1 2204 through field N 2205. The element ID field 2201 may indicate that the current IE is a channel or sector preferences report IE. The length field 2202 may be a field containing the length of the channel or sector preferences report IE. The number of fields field 2203 may indicate the number of fields N 2205 contained in the channel or sector preferences report IE. The number of fields field 2203 may be absent if a fixed number of fields is included. Each of field 1 2204 through field N 2205 may contain the report for one or more channel or sector operating mode(s). Each field may contain the following subfields: channel or sector operating mode(s) subfield 2206 and channel or sector preferences indication subfield 2207.

The channel or sector operating mode subfield 2206 may be specified as described above using, among others, operating bandwidth, bandwidth contiguity, directional transmission, etc. The channel or sector operating mode(s) may be encoded by a particular number referring to one or more particular channel operating mode(s). Alternatively, the channel or sector operating mode(s) may be implemented as a bit map, wherein a positive indication "1" may indicate that the STA is capable of a particular channel operating mode.

A STA may use the channel or sector preferences indication subfield 2207 to indicate its preferences to use one or more channels. The channel preferences indication may be implemented in several ways.

A STA may indicate the channel or sector numbers (associated with the channel operation mode) that it prefers, such as the best one or more channels between itself and the AP. For example, the STA may indicate to the AP that the best three channels that it measured from sounding frames or beacons of the AP are channels 2, 4, and 12 using the channel or sector operation mode associated with channel bandwidth of 1 MHz. In another example, the STA may indicate to the AP that the best three channels that are measured from sounding frames or beacons of the AP are the 2 MHz channel starting with channel 2, 4, and 12 using the channel operation mode associated with channel bandwidth of 2 MHz. Alternatively or additionally, the STA may indicate the transmission sectors of the AP that it prefers, as measured from directional/sectorized beacons from the AP.

Alternatively, a STA may use a bitmap to indicate to the AP the channel(s) or sectors which it prefers, (e.g., because the channel quality is good and acceptable). For example, the STA may use a bitmap to indicate the channels, (for example channels 2, 4, 5, 6, 12, and 14 using a positive indication "1" at the bit position associated with these channels), that the STA has measured from sounding frames or beacons of the AP and of which the measured received signal strength indicator (RSSI), received channel power indicator (RCPI), receive power indication (RPI), or received signal to noise indicator (RSNI) may be higher than a threshold value, or where the STA has observed the least traffic load. Alternatively or additionally, the STA may use a bitmap to indicate its preferred transmission sector(s) of the AP.

Alternatively, a STA may provide detailed, either compressed or uncompressed, channel quality indication in case the STA is capable of multiple-input multiple-output (MIMO) or beamforming.

FIG. 23 is another example format for channel or sector preferences report IE 2300. In this alternative example, the channel or sector preferences report IE may include but is not limited to the following fields: channel or sector operating capabilities field 2303, channel or sector preferences indication field 2304, and an element ID field 2301 and length field 2302.

The channel operating capabilities field 2303 may be implemented as a bitmap, with a positive indication of 1 representing the capability of the STA of operating in that particular channel operation mode. The channel or sector preferences indication field 2304 may be implemented as a bitmap, with a positive indication of "1" representing the channel for which some requirement is satisfied, such as the RCPI, RPI, and/or RSNI level exceeds a threshold, or at least a minimal modulation and coding scheme (MCS) can be achieved, etc. The Channel Operating Capabilities and Channel Preference Indication fields may be related to sectorized transmissions, such as transmission sectors preference indication.

Figure 24:
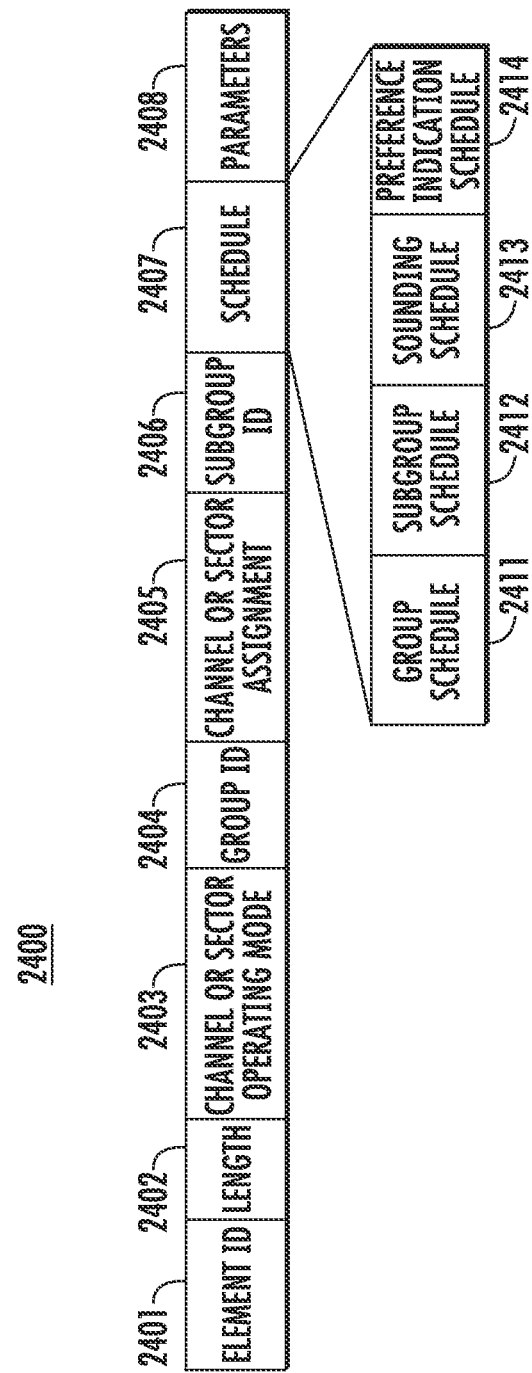
FIG. 24 is a diagram of an example format of the channel assignment IE.

FIG. 24 is a diagram an example format of the channel or sector assignment IE that an AP may transmit to STAs 2400. The channel or sector assignment IE may include but is not limited to the following fields: element ID field 2401, length field 2402, channel or sector operating mode field 2403, group ID field 2404, channel or sector assignment field 2405, subgroup ID field 2406, schedule field 2407, and parameters field 2408.

The element ID field 2401 may indicate that the current IE is a channel or sector assignment IE. The length field 2402 may contain the length of the channel assignment IE. The channel or sector operating mode field 2403 may indicate the channel or sector operating mode assigned to the STA by the AP. The group ID field 2404 may indicate the ID of the group that the STA may be assigned to by the AP. The group assignment may be associated with a group of STAs assigned according to their channel operation capabilities or their channel preferences. The group assignment may be associated with assigning STAs into different time intervals, or transmission sectors, or other physical or logical attributes.

The channel or sector assignment field 2405 may indicate that the channel or sector assignment provided to the STA by the AP, which may be implemented as bitmap, or the number of the starting channel, or the number of the channels (may be of the unit bandwidth) comprising the total assigned channel to the STA.

A STA may be assigned to a subgroup within a group. The subgroup ID field 2406 may indicate the ID of the subgroup that the STA may assigned to by the AP. The subgroup assignment may be associated with a group of STAs assigned according to their channel operation capabilities or their channel preferences. It may be associated with assigning STAs into different time intervals, or transmission sectors, or other physical or logical attributes.

The schedule field 2407 may include but is not limited to group schedule subfield 2411, subgroup schedule subfield 2412, sounding schedule subfield 2413, and/or preference indication schedule subfield 2414.

The group schedule subfield 2411 may indicate the schedule for the group of STAs, such as when the STA may switch to the assigned channel(s), or when the STA may awake to transmit/receive, as well as the duration of the interval assigned to the group of STAs.

The subgroup schedule subfield 2412 may indicate the schedule for the subgroup of STAs, such as when the STA may awake to transmit/receive. The subgroup schedule may include wakeup offset from the starting time of the group schedule, and/or the duration of the RAW, PRAW, TWT, beacon subinterval, access window, TXOP, or TXOP as generally defined above that may be assigned to the subgroup.

The sounding schedule subfield 2413 may indicate the schedule during which the group or subgroup of STAs should wake up and monitor one or more or all channels for sounding frames from the AP.

The preference indication schedule subfield 2414 may indicate the schedule, such as a starting time and duration during which the group or subgroup of STAs are allowed to provide channel preference indication to the AP after conducting the sounding.

The parameters field 2408 may include access parameters with which the STAs may use to access the channel for transmissions, providing channel feedbacks, such as EDCA parameters, contention-based or contention-free access, etc.

It should be noted that any subset of the subfields of the channel or sector preferences report and channel or sector assignment IE may be implemented as a subfield or subsets of subfields of any existing or new IE, or as a part of any action frames, action without ACK frames, control or management frames, or MAC or physical layer convergence protocol (PLCP) headers.

Figure 25:
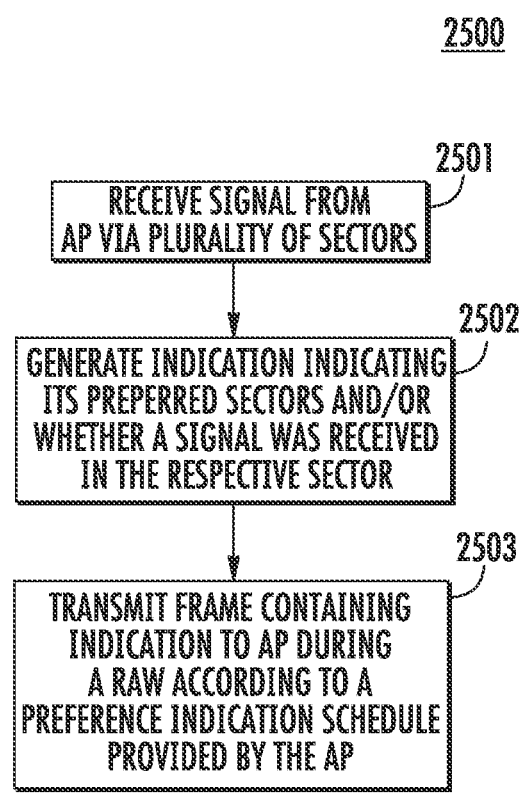
FIG. 25 is a diagram of a flow chart of another example procedure in which STAs may transmit channel or sector data and receive channel or sector assignments.

FIG. 25 is a flow chart of another example procedure in which STAs may transmit channel or sector data and receive channel or sector assignments 2500. This procedure may enable the AP to reduce OBSS interference by selecting sectors that minimize interference. In the example of FIG. 25, a STA may receive a signal from an AP via a plurality of sectors 2501. The STA may then generate an indication indicating its preferred sectors and/or whether a signal was received in the respective sector 2502. This indication may be a bitmap, for example. The STA may then transmit to the AP a frame containing the indication during a TXOP/RAW, or TXOP as generally defined above, according to a preference indication schedule provided by the AP 2503.

The example procedure of FIG. 25 may also be applied to channel preferences and assignments, in which STA may receive a signal from an AP via a plurality of channels. The STA may then generate an indication indicating its preferred channels and/or whether a signal was received in the respective channel. This indication may be a bitmap, for example. The STA may then transmit to the AP a frame containing the indication during a TXOP/RAW, or TXOP as generally defined above, according to a preference indication schedule provided by the AP.

It should be noted that although the embodiments are disclosed with reference to IEEE 802.11 protocols, the embodiments are not restricted to IEEE 802.11 and are applicable to any other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA) in a wireless local area network (WLAN), the method comprising:
   receiving information from an access point (AP) regarding a sounding restricted access window (RAW) and a preference indication RAW;
   receiving a plurality of sounding frames from the AP during the sounding RAW, wherein each of the plurality of sounding frames is associated with a respective sector of the AP;
   generating a feedback message including an indication of at least one preferred sector of the AP based on the received plurality of sounding frames, and a bitmap indicating whether the STA received a sounding frame associated with each of a plurality of sectors of the AP; and
   transmitting the feedback message to the AP during the preference indication RAW.

2. The method of claim 1, further comprising:
   receiving a sector assignment from the AP.

3. A station (STA) configured for use in a wireless local area network (WLAN), the STA comprising:
  a receiver configured to receive information from an access point (AP) regarding a sounding restricted access window (RAW) and a preference indication RAW;
  the receiver further configured to receive a plurality of sounding frames from the AP during the sounding RAW, wherein each of the plurality of sounding frames is associated with a respective sector of the AP;
  a processor configured to generate a feedback message including an indication of at least one preferred sector of the AP based on the received plurality of sounding frames, and a bitmap indicating whether the STA received a sounding frame associated with each of a plurality of sectors of the AP; and
  a transmitter configured to transmit the feedback message to the AP during the preference indication RAW.

4. The STA of claim 3, further comprising:
  the receiver further configured to receive a sector assignment from the AP.

5. A method for use in an access point (AP) in a wireless local area network (WLAN), the method comprising:
  transmitting information to at least one station (STA) regarding a sounding restricted access window (RAW) and a preference indication RAW;
  transmitting a plurality of sounding frames during the sounding RAW, wherein each of the plurality of sounding frames is associated with a respective sector of the AP;
  receiving a feedback message from the at least one STA during the preference indication RAW, wherein the feedback message includes an indication of at least one preferred sector of the AP based on the plurality of sounding frames transmitted from the AP, and a bitmap indicating whether the STA received a sounding frame associated with each of a plurality of sectors of the AP.

6. The method of claim 1, wherein the information from the AP regarding the sounding RAW includes at least one of a RAW start time and a RAW duration; and wherein the information from the AP regarding the preference indication RAW includes at least one of a RAW start time and a RAW duration.

7. The method of claim 2, further comprising:
  receiving or transmitting data packets in a sectorized transmission with the AP, wherein the data packets are transmitted or received in a sector identified in the sector assignment from the AP.

8. The STA of claim 3, wherein the information from the AP regarding the sounding RAW includes at least one of a RAW start time and a RAW duration; and wherein the information from the AP regarding the preference indication RAW includes at least one of a RAW start time and a RAW duration.

9. The STA of claim 4, further comprising:
  the receiver further configured to receive data packets in a sectorized transmission from the AP; and
  the transmitter further configured to transmit data packets in a sectorized transmission to the AP; and
  wherein the data packets are transmitted or received in a sector identified in the sector assignment from the AP.

10. The method of claim 5, wherein the information regarding the sounding RAW includes at least one of a RAW start time and a RAW duration; and wherein the information regarding the preference indication RAW includes at least one of a RAW start time and a RAW duration.

11. The method of claim 5, further comprising:
  transmitting a sector assignment to the at least one STA; and
  transmitting or receiving data packets in a sectorized transmission with the at least one STA, wherein the data packets are transmitted or received in a sector identified in the sector assignment.

* * * * *